(12) United States Patent
Sasaki et al.

(10) Patent No.: US 7,672,840 B2
(45) Date of Patent: Mar. 2, 2010

(54) VOICE SPEED CONTROL APPARATUS

(75) Inventors: Hitoshi Sasaki, Kawasaki (JP); Hiroshi Katayama, Kawasaki (JP); Rika Nishiike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 11/653,952

(22) Filed: Jan. 17, 2007

(65) Prior Publication Data

US 2007/0118363 A1 May 24, 2007

Related U.S. Application Data

(63) Continuation of application No. PCT/JP2004/010340, filed on Jul. 21, 2004.

(51) Int. Cl.
*G10L 21/04* (2006.01)
*G10L 11/02* (2006.01)

(52) U.S. Cl. .................. 704/215; 704/226; 704/503

(58) Field of Classification Search ........... 704/210, 704/215, 226, 233, 240, 253, 502, 503, 504
See application file for complete search history.

(56) References Cited

U.S. PATENT DOCUMENTS

| | | | | |
|---|---|---|---|---|
| 5,305,420 A * | 4/1994 | Nakamura et al. | .......... | 704/271 |
| 5,611,018 A * | 3/1997 | Tanaka et al. | ............... | 704/215 |
| 5,699,481 A * | 12/1997 | Shlomot et al. | ............. | 704/228 |
| 5,809,454 A * | 9/1998 | Okada et al. | ................ | 704/214 |
| 5,842,123 A * | 11/1998 | Hamamoto et al. | ...... | 455/412.2 |
| 5,995,925 A * | 11/1999 | Emori | ......................... | 704/208 |
| 6,324,509 B1 * | 11/2001 | Bi et al. | ....................... | 704/248 |
| 6,374,213 B2 * | 4/2002 | Imai et al. | .................... | 704/233 |
| 6,377,931 B1 * | 4/2002 | Shlomot | ...................... | 704/503 |
| 6,711,536 B2 * | 3/2004 | Rees | .......................... | 704/210 |
| 6,782,363 B2 * | 8/2004 | Lee et al. | ..................... | 704/248 |
| 7,412,376 B2 * | 8/2008 | Florencio et al. | ............ | 704/206 |
| 7,480,613 B2 * | 1/2009 | Kellner | ........................ | 704/231 |

(Continued)

FOREIGN PATENT DOCUMENTS

EP 0944036 9/1999

(Continued)

OTHER PUBLICATIONS

Supplementary European Search Report dated Aug. 27, 2008.

(Continued)

*Primary Examiner*—Martin Lerner
(74) *Attorney, Agent, or Firm*—Kratz, Quintos & Hanson, LLP

(57) ABSTRACT

A voice speed control apparatus comprising: an utterance/non-utterance judging unit judging whether a processing target segment in inputted a voice signal is an utterance segment or a non-utterance segment; a non-utterance continuation length acquiring unit acquiring a non-utterance continuation length representing a length of the voice signal judged continuously to be the non-utterance; a determining unit determining a reproducing speed of the processing target segment in the voice signal in accordance with the non-utterance continuation length so that the reproducing speed gets higher as the non-utterance continuation length gets larger and so that an increase in reproducing speed is restrained to a greater degree as the non-utterance continuation length becomes smaller; and a changing unit changing the reproducing speed of the voice signal, corresponding to the reproducing speed.

7 Claims, 30 Drawing Sheets

U.S. PATENT DOCUMENTS

| | | | |
|---|---|---|---|
| 2001/0032072 A1 | 10/2001 | Inoue | |
| 2002/0004722 A1 | 1/2002 | Inoue | |
| 2003/0028375 A1* | 2/2003 | Kellner | 704/235 |
| 2007/0265839 A1* | 11/2007 | Sasaki et al. | 704/201 |
| 2007/0276657 A1* | 11/2007 | Gournay et al. | 704/203 |

FOREIGN PATENT DOCUMENTS

| | | |
|---|---|---|
| JP | 8-292796 | 11/1996 |
| JP | 9-73299 | 3/1997 |
| JP | 9-147472 | 6/1997 |
| JP | 2000-244972 | 9/2000 |
| JP | 2001-109499 | 4/2001 |
| JP | 2001-154684 | 6/2001 |
| JP | 2001-184100 | 7/2001 |
| JP | 2001-255894 | 9/2001 |
| JP | 2001-318700 | 11/2001 |
| JP | 2003-216200 | 7/2003 |

OTHER PUBLICATIONS

Notice of Reason for Rejection dated Jul. 28, 2009 issued in corresponding Japanese application No. 2006-527702 with English translation.

* cited by examiner

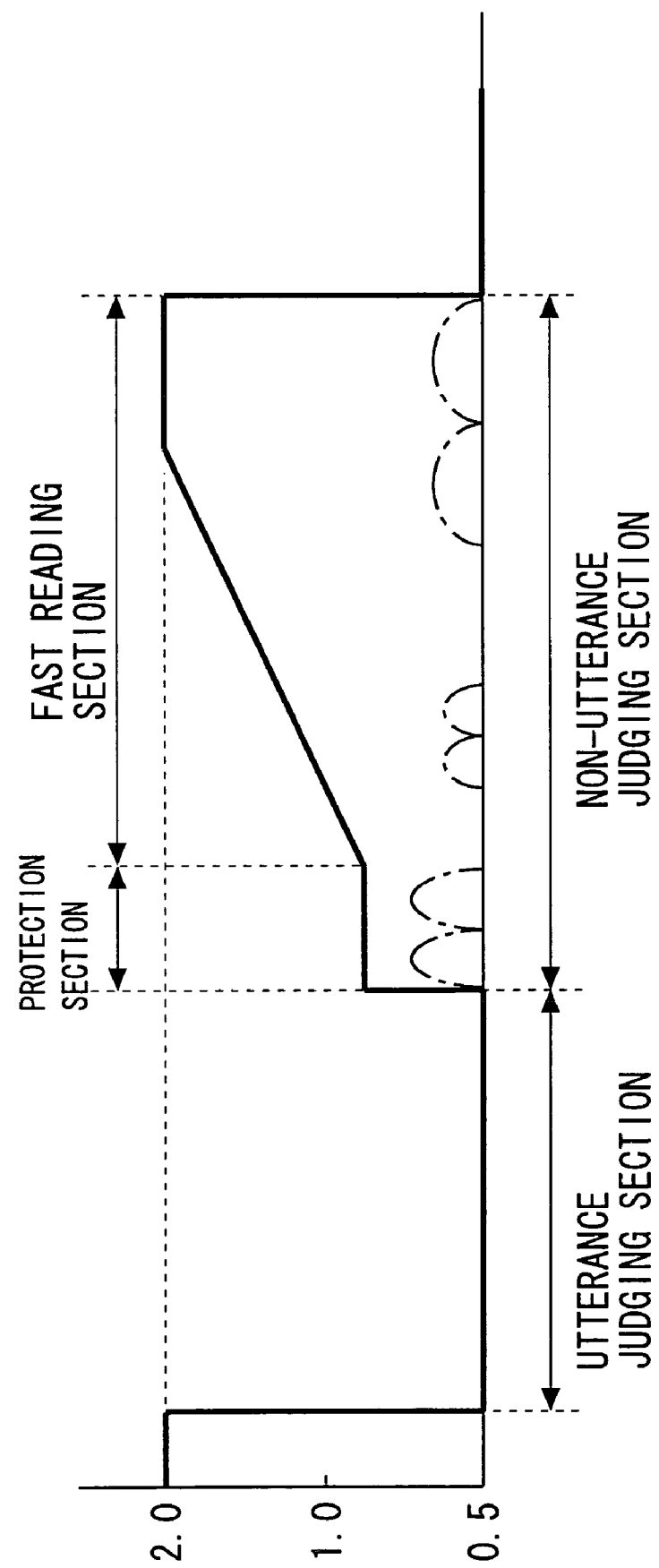

FIG. 19

| DEGREE OF RELIABILITY | RESULT OF SUBTRACTION |
|---|---|
| HIGH | LESS THAN 0dB |
| INTERMEDIATE | EQUAL TO OR LARGER THAN 0dB BUT LESS THAN 3dB |
| LOW | EQUAL TO OR LARGER THAN 3dB BUT LESS THAN 6dB |
| NAUGHT (JUDGED TO BE UTTERED) | EQUAL TO OR LARGER THAN 6dB |

FIG. 20

| DEGREE OF RELIABILITY | MAXIMUM VOICE SPEED |
|---|---|
| HIGH | 2.0 |
| INTERMEDIATE | 1.5 |
| LOW | 1.2 |
| NAUGHT (JUDGED TO BE UTTERED) | 1.0 |

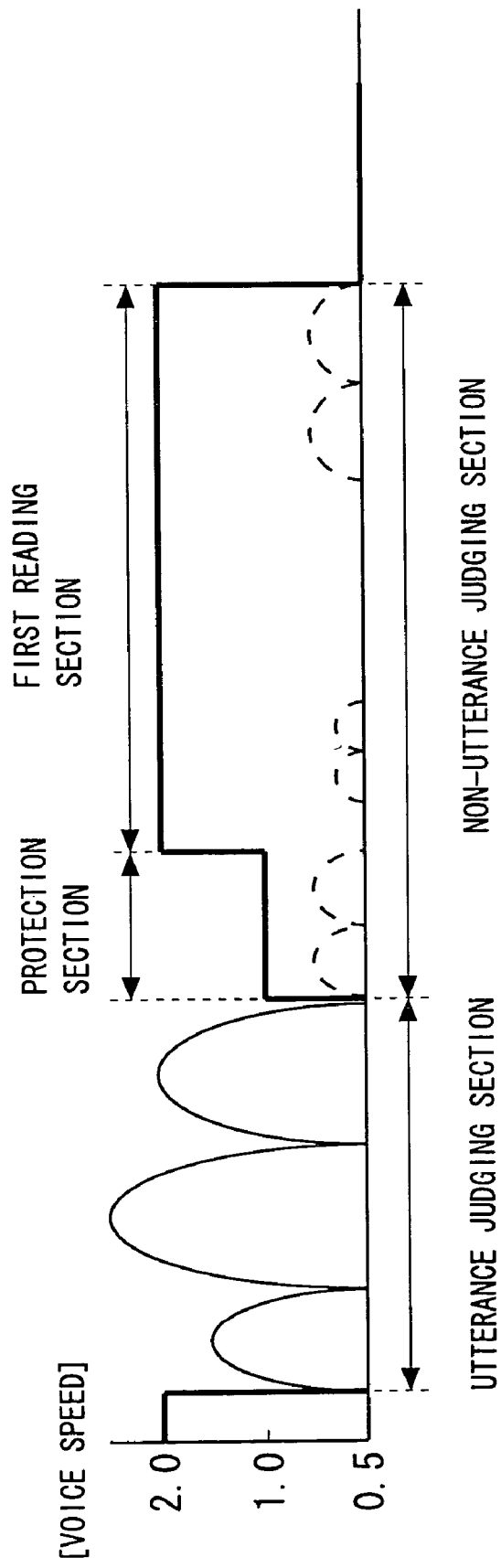

VOICE SPEED CONTROL APPARATUS

CROSS-REFERENCE TO RELATED APPLICATION

This is a continuation of Application PCT/JP2004/010340, filed on Jul. 21, 2004, now pending, the contents of which are herein wholly incorporated by reference.

BACKGROUND OF THE INVENTION

1. Field of the Invention

The present invention relates to a technology effective in being applied to an apparatus, a method and a program that change a reproducing speed of a voice without changing a tone pitch.

2. Description of the Related Art

There has hitherto been proposed a technology for getting a content of a conversation easy to hear by slowing down a speed of the conversion (which will hereinafter be called a "voice speed") without changing a pitch of a voice of a conversing partner. At this time, if only the voice speed is simply slowed down, a delay corresponding to the slowdown occurs. Technologies of obviating the delay are proposed for solving this problem by diminishing a non-utterance section (a section in which a sound such as a human voice is not uttered) existing in the middle (intermission or pause) of the conversation and by getting faster the voice speed in the non-utterance section (refer to Patent documents 1 and 2).

FIG. 25 is a diagram showing an example of function blocks of a conventional voice speed control apparatus P1. In the conventional voice speed control apparatus P1, with respect to an section judged to be non-utterance (which is, i.e., the non-utterance section) by an utterance/non-utterance judging unit P2, a continuation time calculating unit P3 calculates a length of continuation time of this non-utterance section. Then, a voice speed determining unit P4 determines as to whether or not the voice speed should be increased according to the continuation time of the non-utterance section, and the voice speed control unit P5 controls the voice speed in the non-utterance section.

FIG. 26 is a graphic chart for explaining a conventional mechanism of how the voice speed is controlled. In FIG. 26, "t1" represents a non-utterance continuation time threshold value. A section ranging from a start of the non-utterance section up to "t1" is called a protection section. In the protection section, as shown in FIG. 26, the voice speed is set to, e.g., a 1-fold speed without being increased in most cases. If the continuation time (the non-utterance continuation time) of the non-utterance section, which is acquired by the continuation time calculating unit P3, exceeds "t1", the voice speed determining unit P4 determines that the voice speed is doubled. Then, the voice speed control unit P5 controls the voice speed according to this value (the 2-fold value). Herein, the numerical value, which is as specific as the 2-fold value, is an example, and other values (triple, quintuple, etc) may also be available. The delay is obviated by such a process.

Patent document 1: Japanese Patent Application Laid-Open Publication No. 2003-216200

Patent document 2: Japanese Patent Application Laid-Open Publication No. 08-292796

Patent document 3: Japanese Patent Application Laid-Open Publication No. 200-244972

On the occasion of executing the process of diminishing the non-utterance section and the process of increasing the voice speed in the non-utterance section, however, it is necessary to take account of accuracy of the utterance/non-utterance judgment. For instance, there is a case in which misjudgment might occur in the utterance/non-utterance judgment under a noisy environment. FIG. 27 is a graph showing an example of an inputted voice under an environment with no noise. FIG. 28 is a graph showing an example of the inputted voice under an environment with a noise. In FIGS. 27 and 28, each of upper graphs shows a power value, while each of lower graphs shows an example of a result of the utterance/non-utterance judgment. Under the environment with no noise, the precise utterance/non-utterance judgment also about utterance starting points and utterance endpoints is conducted. Under the noisy environment, however, a case is that a noise level takes a value approximate to or exceeding the power value in the utterance starting points and in the utterance endpoints, and in this case the utterance starting points and the utterance endpoints are absorbed by the noises. Hence, under the noisy environment, it is difficult to actualize the precise utterance/non-utterance judgment. For example, under the noisy environment, there is a high possibility, wherein voice elements exhibiting small voice power as at the utterance starting points and at the utterance endpoints might be misjudged to be unuttered in spite of being uttered (which are, e.g., the voice elements depicted by dotted lines in the lower graph in FIG. 28). The voice elements with the small voice power are exemplified by unuttered consonants in addition to the utterance starting points and the utterance endpoints.

If the process of diminishing the non-utterance section and the process of increasing the voice speed on the basis of the misjudgment described above are executed, such problems arise that vanishment of the voice element occurs and the non-utterance continuation length is excessively reduced. FIG. 29 is an explanatory graph showing the problems caused in the case of executing the process of diminishing the non-utterance section and the process of increasing the voice speed in the non-utterance section on the basis of the misjudgment. In FIG. 29A, the utterance starting points and the utterance endpoints are accurately judged because of having no noise. Hence, the process of diminishing the non-utterance section existing between the utterance starting point and the utterance endpoint and the process of increasing the voice speed, are properly carried out. On the other hand, in FIG. 29B, the utterance starting point(s) and the utterance endpoint(s) are misjudged due to the noise. Therefore, in the case of FIG. 29B, the process of diminishing the non-utterance section is executed without taking account of the utterance endpoint (a waveform of the utterance endpoint depicted by the dotted line) judged to be the non-utterance section and the utterance starting points (two waveforms of the utterance starting points drawn by the dotted lines: illustrated in superposition on the waveform of the utterance endpoint) judged to be the non-utterance section. As a result, such a problem is caused that the non-utterance section between the utterance starting point and the utterance endpoint, which are depicted by the dotted lines, gets excessively short, and in the exemplified case the vanishment of the voice element occurs due to cutoff of any one (or both) of the utterance starting point and the utterance endpoint. Further, in the case of increasing the voice speed in the non-utterance section, as compared with the case of diminishing the non-utterance section, the problem that the utterance starting points and the utterance endpoints are lost is prevented. However, the problem of getting hard to hear the utterance starting points and the utterance endpoints still remains unsolved.

This problem, especially about the utterance endpoints, can be obviated to some extent by providing a protection section. FIG. 30 is a graph showing an example of how the voice speed is controlled in the case of providing the protection section. If the misjudgment about the utterance endpoints occurs in excess over the protection section, the problem of getting hard to hear the utterance endpoints is not obviated. In this case, it is considered to set the protection section comparatively long. In the protection section, however, the voice speed is not basically increased, and hence excessive elongation of the protection section hinders the obviation of the delay and is therefore unpreferable.

SUMMARY OF THE INVENTION

Such being the case, it is an object of the present invention, which solves these problems, to provide an apparatus capable of, under the noisy environment, making the utterance endpoints easy to hear even in the case where particularly the utterance endpoints are misjudged to be the non-utterance section, and obviating the delay.

The present invention takes the following configurations in order to solve the problems. A first mode of the present invention is a speed control apparatus comprising an utterance/non-utterance judging unit, a non-utterance continuation length acquiring unit, a determining unit and a changing unit. The utterance/non-utterance judging unit judges whether a processing target segment in inputted voice signals is an utterance segment or a non-utterance segment. The non-utterance continuation length acquiring unit acquires a non-utterance continuation length representing a length of the voice signal judged continuously to be the non-utterance by the utterance/non-utterance judging unit. The non-utterance continuation length may be expressed by use of any kind of units on condition that the unit represents the length of the voice signal. For instance, the non-utterance continuation length may also be expressed by employing a length of time for which to reproduce the voice signal at a normal speed, and may further be expressed by use of a frame count of the voice signals segmented into a plurality of frames. The determining unit determines a reproducing speed of the processing target segment in the voice signals in accordance with the non-utterance continuation length acquired by the non-utterance continuation length acquiring unit so that the reproducing speed gets higher as the non-utterance continuation length gets larger and so that an increase in reproducing speed is restrained to a greater degree as the non-utterance continuation length becomes smaller. The changing unit changes the reproducing speed of the voice signal, corresponding to the reproducing speed determined by the determining unit.

Generally, the utterance endpoints are likely to be judged to be unuttered under the noisy environment for the reason such as the voice power's being small. Accordingly, in the voice signals peripheral to the utterance endpoints, if the voice speed is abruptly increased after the non-utterance judgment has been made, the result is the voice speed in a segment of the misjudged utterance endpoints is subjected to a sharp increase, and an adverse influence as of the vanishment of the voice element has hitherto been produced. To cope with this problem, according to the first mode of the present invention, the non-utterance continuation length is acquired, and the reproducing speed in the segment judged to be unuttered is determined corresponding to the acquired non-utterance continuation length. At this time, the voice speed is determined so that the increase in reproducing speed is restrained to the greater degree as the non-utterance continuation time gets shorter. Hence, there is restrained the degree of the speedup in the segment having the short non-utterance continuation time, i.e., the segment exhibiting a high possibility in which the utterance endpoints exist. It is therefore possible to prevent or reduce the adverse influence as of the vanishment of the voice element at the utterance endpoints. On the other hand, the reproducing speed Is determined to get higher as the non-utterance continuation length gets larger. Accordingly, with respect to the segment having the long non-utterance continuation time, i.e., the segment exhibiting a low possibility that the utterance endpoints exist, the delay can be efficiently obviated by emphasizing the speedup.

According to the first aspect of the present invention, the speed control apparatus may be configured to further comprise a speed decreasing unit getting, if judged to be utterance by the utterance/non-utterance judging unit, the reproducing speed of the voice signal slower than a normal reproducing speed, and a delay quantity acquiring unit acquiring cumulatively a delay quantity generated by the speed decreasing unit. If thus configured, the determining unit determines a maximum value of the reproducing speed on the basis of an accumulated value of the delay quantities acquired by the delay quantity acquiring unit so that the maximum value of the reproducing speed gets larger as the accumulated value of the delay quantities gets larger, and determines the reproducing speed in the processing target segment in the voice signals, corresponding to this maximum value and the non-utterance continuation length.

According to the first aspect of the present invention having this configuration, the speed decreasing unit carries out the low-speed reproduction of the segment judged to be uttered, and hence a user gets easy to hear the voice of the segment (the uttered segment) judged to be uttered. Then, the determining unit and the changing unit increase the reproducing speed of the segment (unuttered segment) judged to be unuttered, thereby obviating the delay caused by the speed decreasing unit. At this time, the determining unit determines the maximum value when determining the reproducing speed, corresponding to the accumulated value of the delay quantities generated from the speed-down by the speed decreasing unit. Therefore, the reproducing speed is determined so as to become higher as the accumulated value of the delay quantities becomes larger, thereby effectively obviating the accumulated delay. On the other hand, if the accumulated value of the delay quantities is small, the increase in reproducing speed is restrained, so that the priority is given to preventing the adverse influence as of the missing voice element (the skip of the voice element) rather than the speedup that is not required in particular.

According to the first aspect of the present invention, the utterance/non-utterance judging unit may be constructed so as to further make judgment about predetermined segments in the future direction from the processing target segment in the inputted voice signals. In this case, the non-utterance continuation length acquiring unit is constructed to acquire a future-directional continuation length representing a length of the signal judged to be the non-utterance signal continuously from the processing target segment in the future direction. Furthermore, the determining unit determines, if the future-directional continuation length is smaller than a threshold value, the reproducing speed in the processing target segment in accordance with the future-directional continuation length so that the reproducing speed becomes slower as the future-directional continuation length becomes smaller.

According to the first aspect of the present invention having this configuration, the voice speed of the segment judged to be unuttered is determined based on the non-utterance continuation length in the future direction. To be specific, the determining unit determines the voice speed so that the voice speed becomes slower as the non-utterance continuation length in the future direction becomes shorter. Therefore, the voice speed of the non-utterance segment close to the segment judged to be uttered is restrained from rising. Consequently, it is feasible to prevent or reduce the adverse influence (as of the vanishment of the voice element etc) if misjudged to be unuttered at the utterance starting points.

According to the first aspect of the present invention, the utterance/non-utterance judging unit may be constructed so as to further acquire a degree of reliability on the judgment result about the respective segments to be judged. In this case, the determining unit determines the maximum value of the reproducing speed in accordance with the degree of reliability so that the maximum value of the reproducing speed gets larger as the degree of reliability gets higher, and determines the reproducing speed in the processing target segment in the voice signals in accordance with the maximum value and the non-utterance continuation length.

According to the first aspect of the present invention having this configuration, the maximum voice speed is determined based on the degree of reliability on the result of the judgment. Specifically, the maximum voice speed on the occasion of determining the voice speed of the non-utterance segment gets higher as the degree of reliability on the result of the judgment gets higher. Hence, if the degree of reliability on the result of judgment of being unuttered is low, the maximum voice speed can be restrained low. It is therefore possible to reduce the adverse influence as of the skip of the voice element when the misjudgment occurs. While on the other hand, if the degree of reliability on the result of judgment of being unuttered is high, the maximum voice speed is set high. Hence, the priority is given to increasing the voice speed rather than reducing the adverse influence in the case of the misjudgment, and the accumulation of the delays can be effectively reduced.

According to the first aspect of the present invention, the utterance/non-utterance judging unit may be constructed to subtract an average of power values of the voice signals in the segments judged to be the non-utterance segments in the past from a power value of the voice signal in the processing target segment, and to acquire, based on a result of this subtraction, a degree of reliability that gets higher as a value of the subtracted result gets lower and also a degree of reliability that becomes lower as the value of the subtracted result becomes higher.

According to the first aspect of the present invention, the speed control apparatus may be configured to further comprise signal-to-noise ratio acquiring unit acquiring a signal-to-noise ratio in the processing target segment in the voice signals. In this case, the determining unit determines a maximum value of the reproducing speed in accordance with the signal-to-noise ratio acquired by the signal-to-noise ratio acquiring unit so that the maximum value of the reproducing speed gets larger as the signal-to-noise ratio gets higher and so that the maximum value of the reproducing speed becomes smaller as the signal-to-noise ratio becomes lower, and determines the reproducing speed in the processing target segment in the voice signals in accordance with the maximum value and the non-utterance continuation length.

According to the first aspect of the present invention having this configuration, the maximum voice speed is determined corresponding to the signal-to-noise ratio (SN ratio). If the SN ratio is high, i.e., if the signal is preferable, there is a low possibility in which the misjudgment occurs in the utterance/non-utterance judgment, and therefore the maximum value of the speedup is set high, thereby scheming to obviate the delay. Whereas if the SN ratio is low, i.e., whereas if the signal is not preferable, there is a high possibility in which the misjudgment occurs in the utterance/non-utterance judgment, and hence the maximum value of the speedup is set low, thereby preventing the occurrence of the adverse influence.

A second aspect of the present invention is a speed control apparatus comprising an utterance/non-utterance judging unit, a speed decreasing unit, a delay quantity acquiring unit, a determining unit and a changing unit. The utterance/non-utterance judging unit judges whether a processing target segment in inputted voice signals is an utterance segment or a non-utterance segment. The speed decreasing unit makes, if judged to be the utterance by the utterance/non-utterance judging unit, a reproducing speed of the voice signal slower than a normal reproducing speed. The delay quantity acquiring unit acquires cumulatively a delay quantity generated by the speed decreasing unit. The determining unit determines the reproducing speed of the processing target segment in the voice signals on the basis of the accumulated delay quantity acquired by the delay quantity acquiring unit so that the reproducing speed gets higher as the delay quantity gets larger. The changing unit changes the reproducing speed of the voice signal according to the reproducing speed determined by the determining unit.

According to the second aspect of the present invention having this configuration, the increase in reproducing speed is actualized based on not the non-utterance continuation length but the accumulated value of the delay quantities, and substantially the same effect as in the first aspect of the present invention is exhibited.

A third aspect of the present invention is a speed control apparatus comprising a unit judging whether an inputted voice signal is an utterance or anon-utterance; and a unit decreasing a reproducing speed in an utterance section in the voice signal while performing one of diminishing a non-utterance section in the voice signal and increasing the reproducing speed in the non-utterance section.

The first aspect through the third aspect may be actualized in such a way that an information processing apparatus executes a program. Namely, the present invention can be specified as a program for making the information processing apparatus execute the processes executed by the respective unit in the first aspect through the third aspect described above, or specified as a recording medium recorded with the program. Further, the present invention may also be specified as a method by which the information processing apparatus executes the processes executed by the respective unit described above.

According to the present invention, it is possible to prevent or reduce the adverse influence as of the vanishment of the voice element etc at the utterance endpoints. On the other hand, in the segment having a low possibility in which the utterance endpoints exist, the delay can be efficiently obviated by emphasizing the speedup.

BRIEF DESCRIPTION OF THE DRAWINGS

FIG. 6 is a graphic chart showing an example of how the voice speed is controlled in the first embodiment of the voice speed control apparatus;

FIG. 19 is a table showing a relational example between a degree of reliability and a result of subtraction;

FIG. 20 is a table showing a relational example between a degree of reliability and a maximum voice speed;

FIG. 30 is a graph showing an example of how the voice speed is controlled in the case of providing a protection section.

Figure 1:
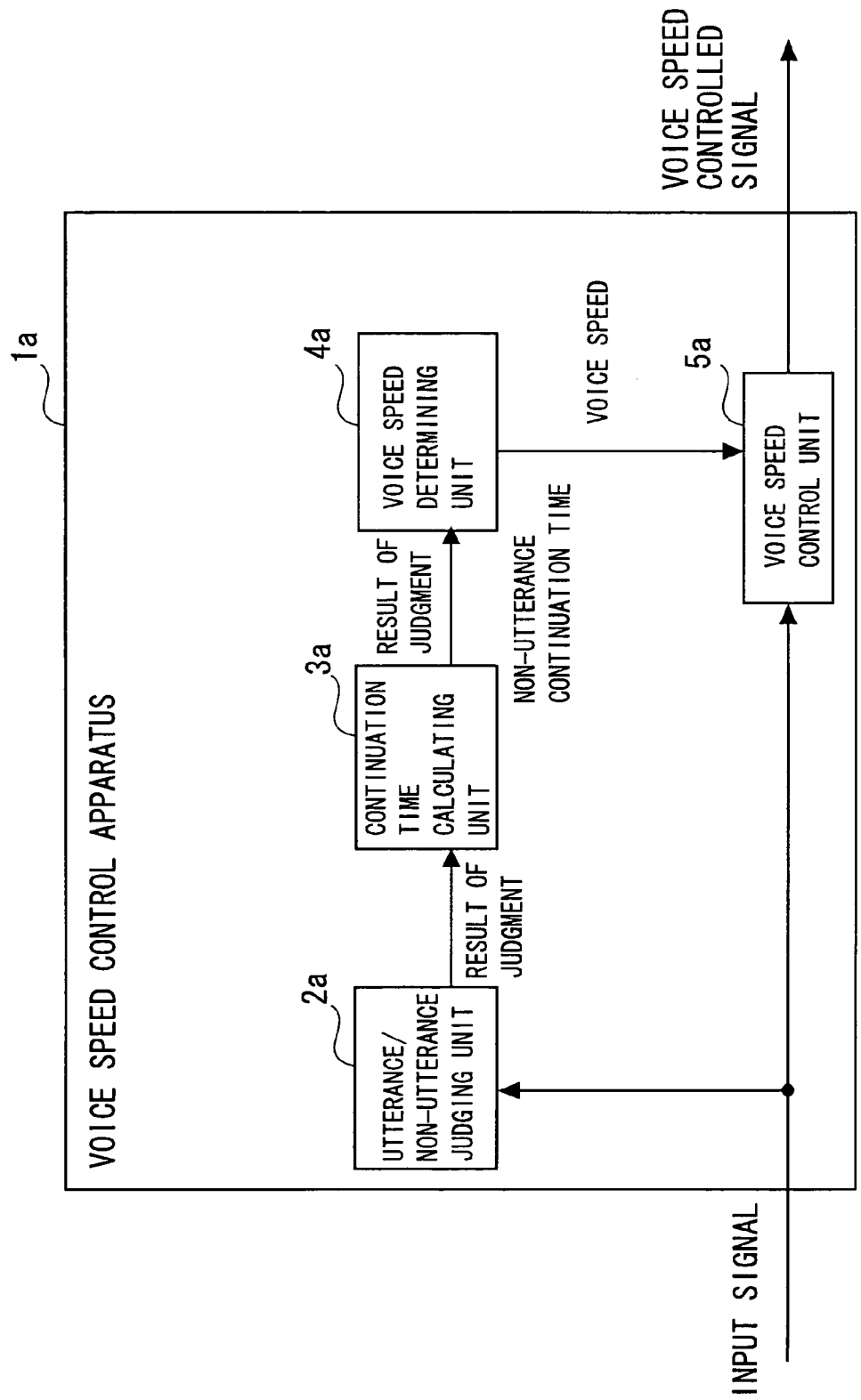
FIG. 1 is a diagram showing an example of function blocks in a first embodiment of a voice speed control apparatus.

DESCRIPTION OF THE REFERENCE NUMERALS AND SYMBOLS 1a, 1b, 1c, 1d, 1e voice speed control apparatus
2a, 2c, 2d utterance/non-utterance judging unit
3a, 3c continuation time calculating unit
4a, 4b, 4c, 4d, 4e voice speed determining unit
5a, 5b voice speed control unit
6 delay quantity acquiring unit
7 signal-to-noise ratio acquiring unit
P1 voice speed control apparatus
P2 utterance/non-utterance judging unit
P3 continuation time calculating unit
P4 voice speed determining unit
P5 voice speed control unit

DETAILED DESCRIPTION OF THE PREFERRED EMBODIMENTS

First Embodiment

[System Architecture]

To start with, an example of a configuration of a voice speed control apparatus 1a will be explained by way of a first embodiment of a voice speed control apparatus 1. The voice speed control apparatus 1a includes hardwarewise a CPU (Central Processing Unit), a main storage device (RAM) and an auxiliary storage device, which are connected to each other via a bus. The auxiliary storage device is constructed by use of a nonvolatile storage device. The nonvolatile storage device connoted herein represents a so-called ROM (Read-Only Memory including an EPROM (Erasable Programmable Read-Only Memory), an EEPROM (Electrically Erasable Programmable Read-Only Memory), a mask ROM, etc), an FRAM (Ferroelectric RAM), a hard disc and so on.

FIG. 1 is a diagram showing an example of function blocks of the voice speed control apparatus 1a. The voice speed control apparatus 1a functions as an apparatus including an utterance/non-utterance judging unit 2a, a continuation time calculating unit 3a, a voice speed determining unit 4a and a voice speed control unit 5a by loading the main storage device with a variety of programs (an OS, applications, etc) stored in the auxiliary storage device and by making the CPU execute the programs. The CPU executes the programs, thereby actualizing the utterance/non-utterance judging unit 2a, the continuation time calculating unit 3a, the voice speed determining unit 4a and the voice speed control unit 5a. Further, the utterance/non-utterance judging unit 2a, the continuation time calculating unit 3a, the voice speed determining unit 4a and the voice speed control unit 5a may also be constructed as dedicated chips. Next, the respective function units included in the voice speed control apparatus 1a will be explained.

<Utterance/Non-Utterance Judging Unit>

The utterance/non-utterance judging unit 2a judges whether a processing target segment (frame) of input signals inputted to the voice speed control apparatus 1a is a voice utterance segment or a voice non-utterance segment (this process is called a [utterance/non-utterance judgment]). Any type of existing utterance/non-utterance judging technologies may be applied to the utterance/non-utterance judging unit 2a. A specific example of the process executed by the utterance/non-utterance judging unit 2a will hereinafter be described.

Figure 2:
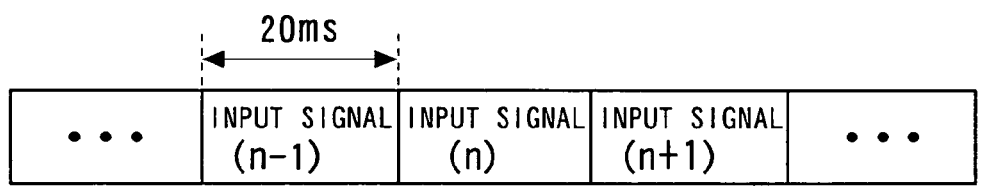
FIG. 2 is a diagram showing an example of input signals.

FIG. 2 is a diagram showing an example of the input signals. FIG. 2 shows the example of the input signals in the case of executing the process on a frame-by-frame basis, wherein one frame is on the order of 20 ms (160 samples when a sample rate is 8 kHz). Namely, in this case, each of the frames as illustrated in FIG. 2 becomes the processing target segment (frame). For example, the utterance/non-utterance judging unit 2a can judge based on a power value of the input signal whether the voice is uttered or unuttered. When the processing target frame is set to an input signal (n), at first, the utterance/non-utterance judging unit 2a calculates a power value (e.g., a sum-of-squares mean value of the input signal (n)) of the input signal (n). Next, the utterance/non-utterance judging unit 2a calculates a non-utterance mean power value (a mean on the unit of dB) of the past frames (an input signal (n−1), an input signal (n−2), . . . ). Subsequently, the utterance/non-utterance judging unit 2a subtracts the non-utterance mean power value of the past frames from the power value of the input signal (n). Then, the utterance/non-utterance judging unit 2a makes the utterance/non-utterance judgment, depending on whether a result of this subtraction is larger than a threshold value or not.

Note that a content of the process of making the utterance/non-utterance judgment described above is given by way of one example, and the utterance/non-utterance judgment may be actualized by applying other processes. The utterance/non-utterance judging unit 2a transfers the result of the judgment to the continuation time calculating unit 3a.

<Continuation Time Calculating Unit>

The continuation time calculating unit 3a calculates a period of time (non-utterance continuation time) as a length of the signal of which a non-utterance state continues in the input signal on the occasion of reproducing the signal at a normal speed. Namely, the continuation time calculating unit 3a calculates the period of time for which the utterance/non-utterance judging unit 2a continues to judge that there is a continuous non-utterance state. The continuation time calculating unit 3a transfers the thus-calculated non-utterance continuation time to the voice speed determining unit 4a.

Another scheme may also be taken, wherein other values such as a number of frames (frame count) judged to be unuttered and an amplitude count are, it is to be noted, each used as the length of the signal of which the non-utterance state continues in the input signal.

<Voice Speed Determining Unit>

Figure 3:
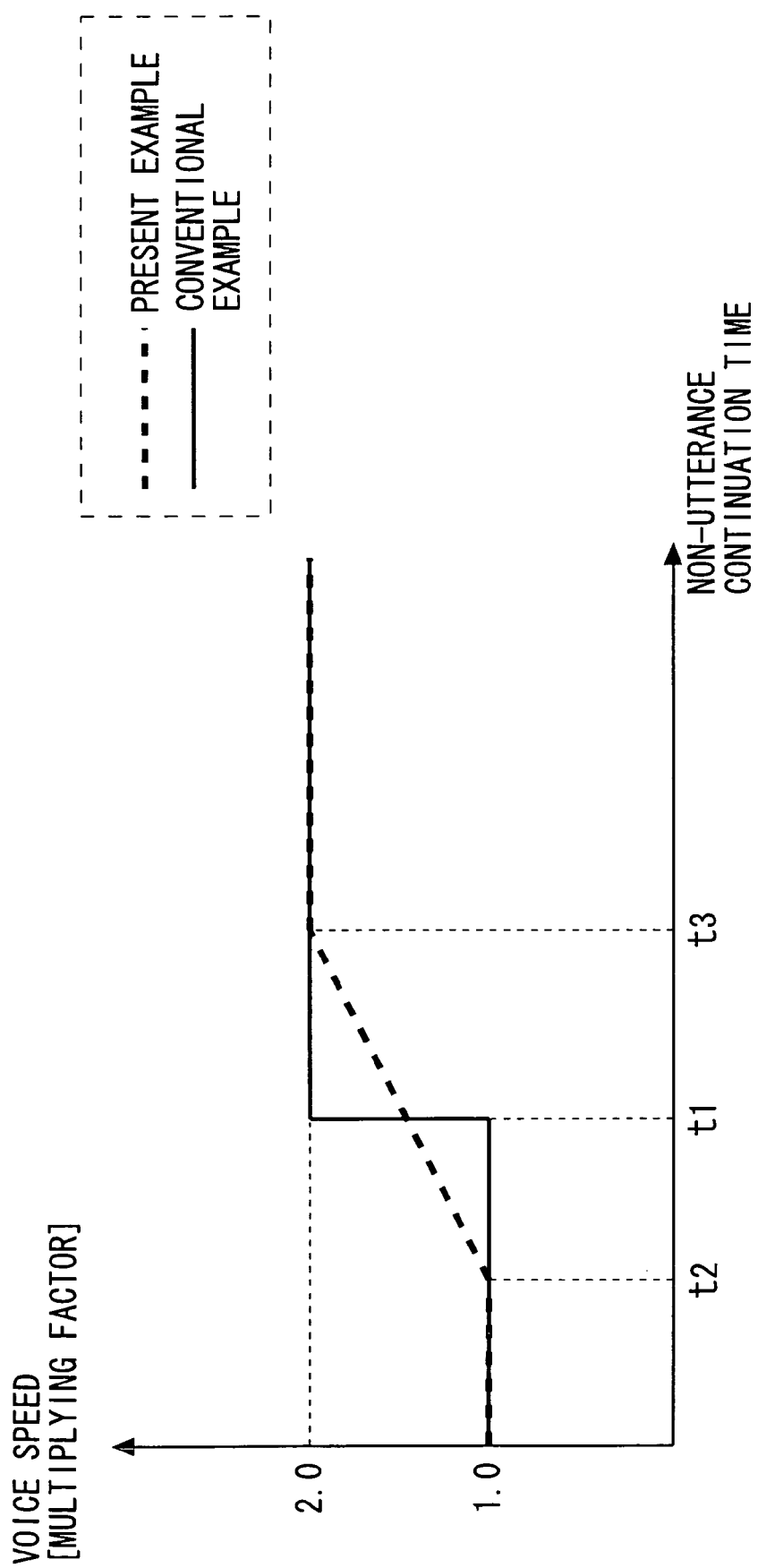
FIG. 3 is a graphic chart showing an example of how a voice speed is controlled by a voice speed determining unit if judged to be unuttered.
Figure 4:
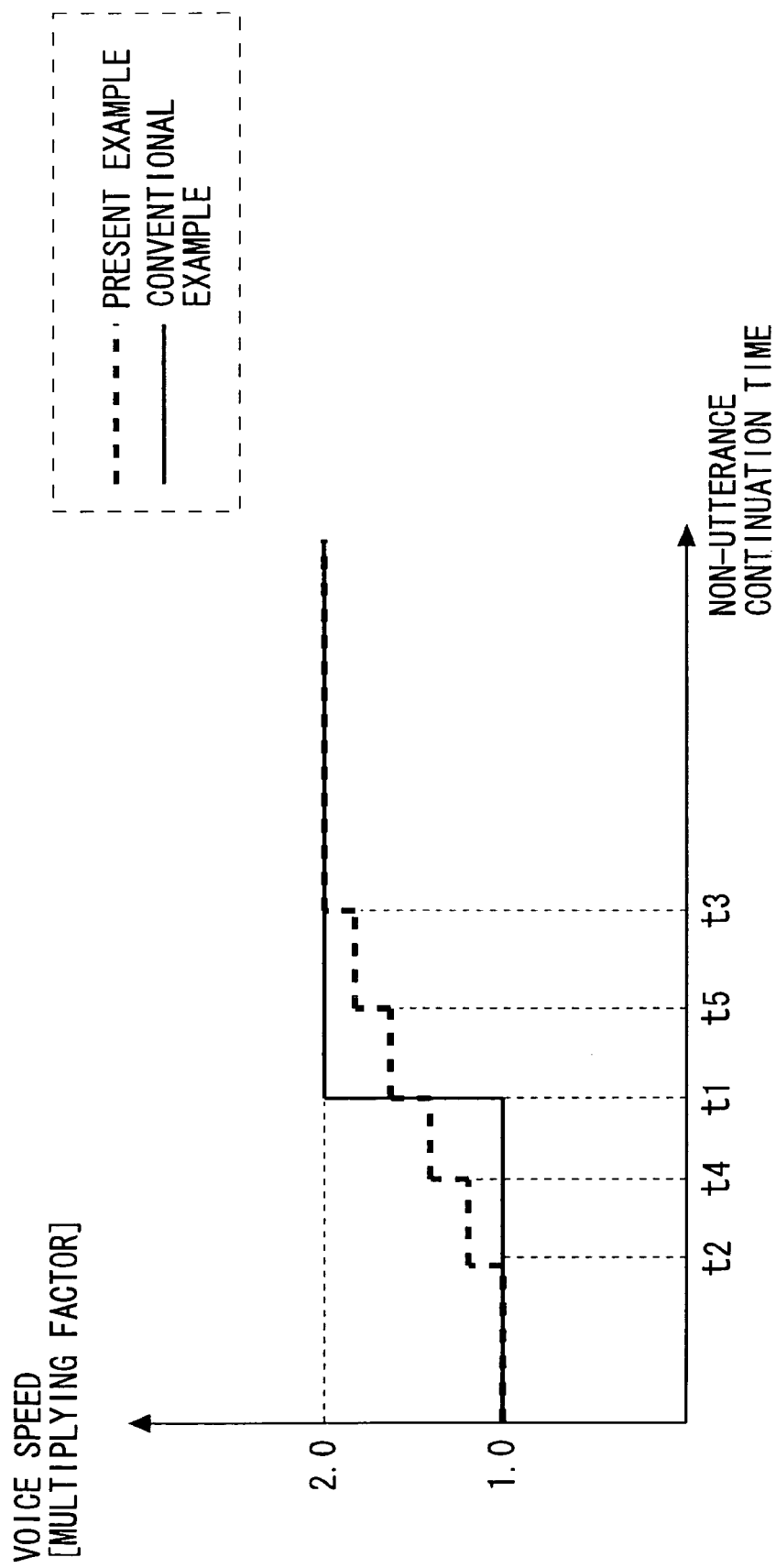
FIG. 4 is a graphic chart showing an example of how the voice speed is controlled by the voice speed determining unit if judged to be unuttered.

The voice speed determining unit 4a, if the result of the judgment by the utterance/non-utterance judging unit 2a shows the non-utterance state, determines a voice speed in accordance with the non-utterance continuation time calculated by the continuation time calculating unit 3a. FIGS. 3 and 4 are graphic charts each showing an example of how the voice speed determining unit 4a controls the voice speed when judged to be the non-utterance state. In FIGS. 3 and 4, a graph depicted by a bold broken line represents a relationship between the voice speed determined by the voice speed determining unit 4a and the non-utterance continuation time. The voice speed determining unit 4a determines so that the voice speed gets faster as the non-utterance continuation time gets longer. For instance, the voice speed determining unit 4a may double a multiplying factor of the voice speed linearly in an increasing direction from a point of time when the non-utterance continuation time exceeds a threshold value t2 up to a threshold value t3 (see FIG. 3). In this case, for example, the voice speed determining unit 4a may calculate the voice speed from the non-utterance continuation time on the basis of a mathematical expression representing the relationship between the non-utterance continuation time and the voice speed. At this time, the voice speed may also be set to increase linearly from t2 to t3 and may also be set increase non-linearly.

Further, the voice speed determining unit 4a may double the voice speed at multi-stages (5-stages in FIG. 4) in the increasing direction in accordance with the non-utterance continuation time (see FIG. 4). In this case, the voice speed determining unit 4a may determine the voice speed at the multi-stages on the basis of a plurality of threshold values (t1-t5) provided for the non-utterance continuation time. The voice speed determining unit 4a transfers the determined voice speed to the voice speed control unit 5a.

Moreover, the voice speed determining unit 4a, if the utterance/non-utterance judging unit 2a judges the voice to be uttered, determines a voice speed in an utterance section. For example, the voice speed determining unit 4a determines that the voice speed in the utterance section is set slower than a normal voice speed (e.g., slower than a 1-fold speed). Such a scheme is thus taken, a user gets easy to hear the voice in the utterance section.

<Voice Speed Control Unit>

The voice speed control unit 5a changes the voice speed of the input signal according to the voice speed determined by the voice speed determining unit 4a. To be specific, the voice speed control unit 5a changes the voice speed in the processing target frame, i.e., the frame subjected to the utterance/non-utterance judgment made by the utterance/non-utterance judging unit 2a. Then, the voice speed control unit 5a outputs, as a voice speed controlled signal, the signal after the voice speed has been changed.

OPERATIONAL EXAMPLE

Figure 5:
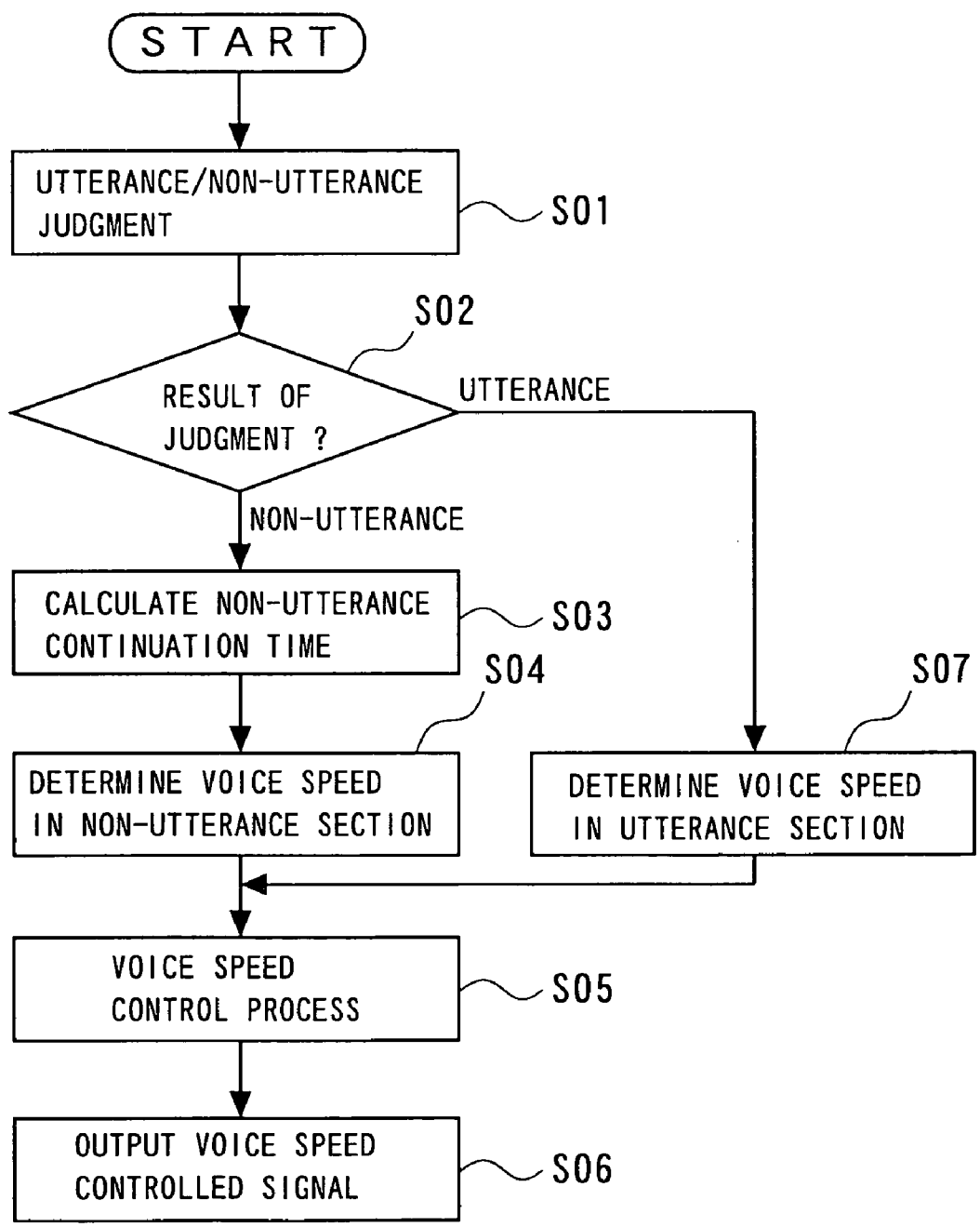
FIG. 5 is a flowchart showing an operational example in the first embodiment of the voice speed control apparatus.
Figure 7A:
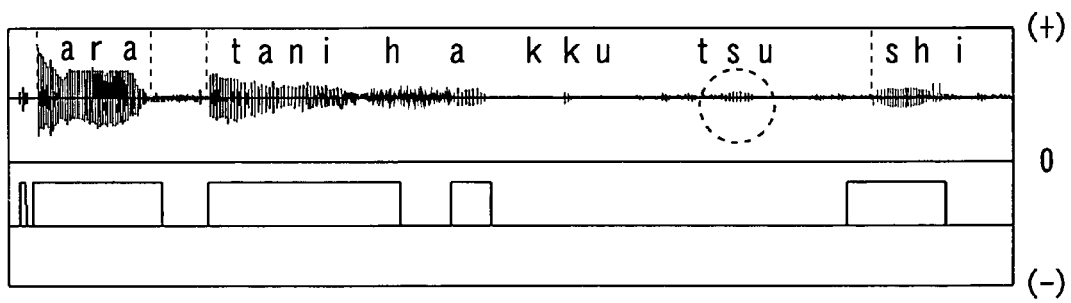
FIGS. 7A, 7B, 7C, and 7D are graphs showing an example of an effect in the first embodiment of the voice speed control apparatus.
Figure 7B:
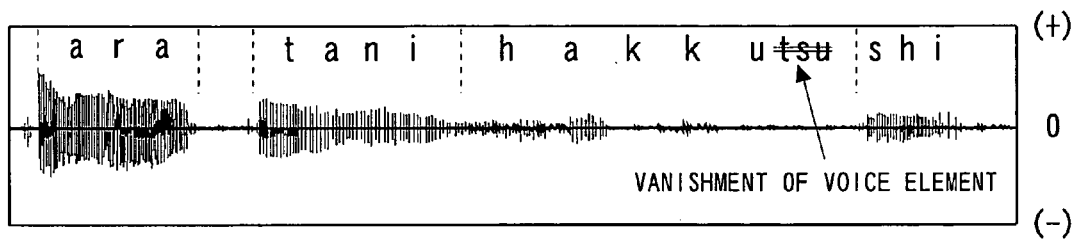
Figure 7C:
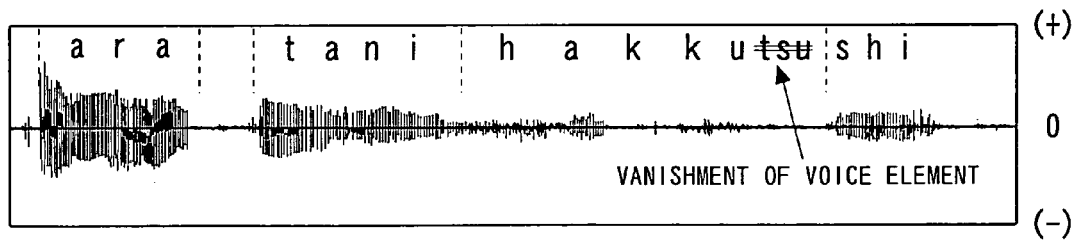
Figure 7D:
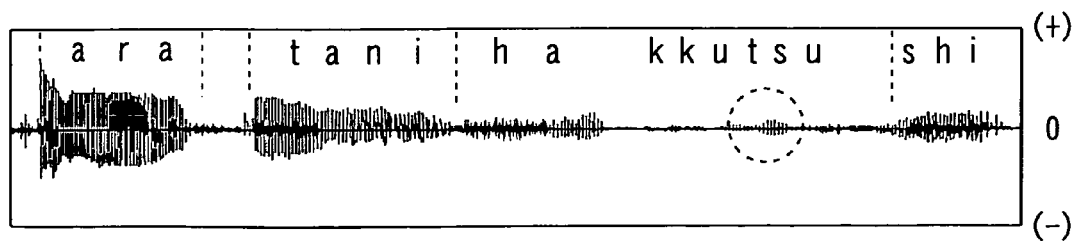

FIG. 5 is a flowchart showing an operational example of the voice speed control apparatus 1a. The operational example of the voice speed control apparatus 1a will hereinafter be explained with reference to FIG. 5. Upon a start of the process, to begin with, the input signals are inputted to the voice speed control apparatus 1a. Then, the utterance/non-utterance judging unit 2a makes the utterance/non-utterance judgment about the processing target frame in the input signals (S01). As a result of this judgment, when judging that the processing target frame is the non-utterance frame (S02: non-utterance), the continuation time calculating unit 3a calculates a period of non-utterance continuation time (S03). Next, the voice speed determining unit 4a determines a voice speed in the non-utterance section on the basis of this non-utterance continuation time (S04). While on the other hand, when judging in S02 that the processing target frame is the utterance frame (S02: utterance), the voice speed determining unit 4a determines the voice speed in the processing target frame as the utterance section (S07). Then, the voice speed control unit 5a executes a voice speed control process of the processing target frame (S05) and outputs the voice speed controlled signal (S06).

[Operation/Effect]

The voice speed control apparatus 1a determines that the voice speed in the non-utterance section becomes faster according to the length of the non-utterance continuation time. FIG. 6 is a graphic chart showing an example of how the voice speed control apparatus 1a controls the voice speed. The scheme being taken as described above, in the voice speed control apparatus 1a, for instance, even if misjudgment of utterance endpoints occurs exceeding a protection section, these utterance endpoints are not speeded up, wherein a degree of speedup is restrained (e.g., the voice speed is changed to a level approximate to the 1-fold speed). It is therefore possible to obviate a problem of causing difficulty to hear the voice elements of the utterance endpoints and a problem that some voice elements vanish at the utterance endpoints. Further, the voice speed increases corresponding to the length of the non-utterance continuation time, and hence it does not happen that the obviation of the delay is hindered. Moreover, as in FIG. 6, the voice utterance can be made easier to hear than by the prior art in a way that restrains next utterance starting points (or part of the utterance starting points) as the case may be.

Further, the voice speed control apparatus 1a is capable of obviating the problem such as the vanishment of the voice elements without increasing the delay quantity so much by changing a length of the protection section and changing a gradient of a voice speed change rate after the protection section. In other words, the voice speed can be minutely controlled, and, if the misjudgment occurs, an adverse influence thereof can be minimized. For instance, in the case of emphasizing a realtime process, it is effective to shorten the protection section while increasing the gradient. Moreover, for example, in FIG. 3, the protection section ranging up to "t1" is reduced down to "t2" shorter than "t1". In FIG. 3, the vanishment of the voice elements can be prevented in a way that equalizes the quantity of obviation of the delay in the prior art and the quantity of obviation of the delay in tile voice speed control apparatus 1a to each other by equalizing a length of time from "t2" to "t1" to a length of time from "t1" to "t3".

Furthermore, FIG. 7 is a diagram showing an example of the effect of the voice speed control apparatus 1a. FIGS. 7(a) through 7(d) are graphs depicting waveforms of a voice uttered such as "ara-ta-ni-ha-kku-tsu-shi (it is newly excavated)". FIG. 7(a) shows the waveform undergoing none of processing both in the utterance section and in the non-utterance section, i.e., shows the input signals themselves. In FIGS. 7(b) through 7(d), the voice speed is slowed down in the utterance section. FIG. 7(b) illustrates an output waveform in the case of carrying out the prior art that diminishes the non-utterance section. FIG. 7(c) shows an output waveform in the case of carrying out the prior art that increases the voice speed in the non-utterance section. Then, FIG. 7(d) shows an output waveform (a waveform of a voice speed change signal) in a case where the voice speed control apparatus 1a increases the voice speed in the non-utterance section. As understood from FIG. 7(a), a voice element "tsu" as one of the utterance endpoints in "ha-kku-tsu-shi" shows a small power value. Hence, this voice element "tsu" might be misjudged to be unuttered. Due to the influence of the misjudgment, it is known from FIGS. 7(b) and 7(c) that the vanishment of the voice element occurs. On the other hand, in FIG. 7(d), even if the voice element "tsu" is misjudged to be unuttered, it is recognized that none of the vanishment of the voice element occurs because of preventing a rapid increase in voice speed in the non-utterance section.

Moreover, such a problem pertaining to the delay time has hitherto arisen that in the case of bidirectional communications, when changing a reproducing speed, the delay increases before and after the change, and the communications get hard to perform or can not be established, however, this type of problem can be also solved.

MODIFIED EXAMPLE

The voice speed control apparatus 1a, as shown in FIG. 6, executes a process of decreasing the voice speed in the utterance section but may also be configured not to execute this process. Namely, the voice speed control apparatus 1a executes the process of increasing the voice speed in the non-utterance section but may also be configured not to execute the process of decreasing the voice speed in the utterance section. For instance, as in the case of an IP telephone (Internet Protocol telephone), it is effective that the voice speed control apparatus 1a is applied to a system where the delay occurs even when executing the process of slowing down the voice speed particularly in the utterance section. In this case, a delay occurred due to a cause different from the voice speed control in the IP telephone can be obviated.

Further, the voice speed control apparatus 1a may be configured to, in the case of decreasing the voice speed in the utterance section, calculate the continuation time in the utterance section and to determine the voice speed in the utterance section corresponding to this continuation time.

Second Embodiment

[System Architecture]

Figure 8:
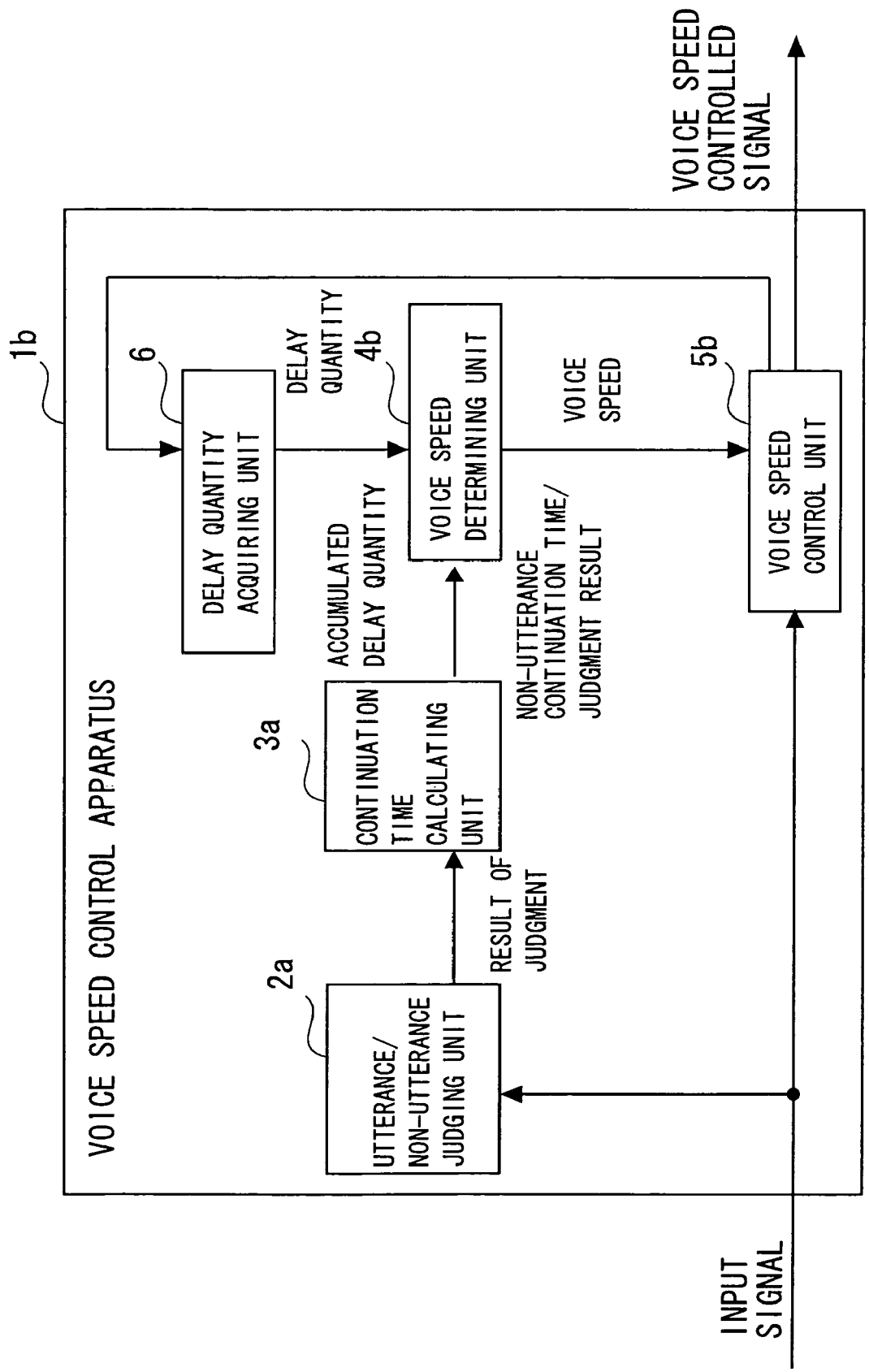
FIG. 8 is a diagram showing an example of function blocks in a second embodiment of the voice speed control apparatus.

Next, an example of a configuration of a voice speed control apparatus 1b will be explained by way of a second embodiment of the voice speed control apparatus 1. FIG. 8 is a diagram showing an example of function blocks of the voice speed control apparatus 1b. The voice speed control apparatus 1b is different from the voice speed control apparatus 1a in terms of including a delay quantity acquiring unit 6, a voice speed determining unit 4b that replaces the voice speed determining unit 4a and a voice speed control unit 5b in place of the voice speed control unit 5a. Other components of the voice speed control apparatus 1b are basically the same as those of the voice speed control apparatus 1a. Different points of the voice speed control apparatus 1b from the voice speed control apparatus 1a will hereinafter be described.

<Voice Speed Control Unit>

The voice speed control unit 5b, if the result of the judgment by the utterance/non-utterance judging unit 2a shows the utterance, slows down the voice speed of the processing target frame. At this time, the voice speed control unit 5b may decrease the voice speed on the basis of the voice speed in the utterance section that is determined by the voice speed determining unit 4b, and may also decrease the voice speed in the utterance section down to a predetermined voice speed irrespective of the determination of the voice speed determining unit 4b.

Further, the voice speed control unit 5b notifies the delay quantity acquiring unit 6 of a delay quantity generated each time the voice speed is changed. For example, the voice speed control unit 5b may acquire the delay quantity taking a positive value in the case of carrying out the voice speed control to decrease the voice speed in the utterance section and the delay quantity taking a negative value in the case of carrying out the voice speed control to increase the voice speed in the non-utterance section, and may notify the delay quantity acquiring unit 6 of the respective delay quantities.

<Delay Quantity Acquiring Unit>

The delay quantity acquiring unit 6 acquires an accumulated delay quantity at each point of time of processing by accumulating the delay quantities generated when the voice speed control unit 5b decreases the voice speed in the utterance section (which will hereinafter be referred to as the "accumulated delay quantity"). For instance, the delay quantity acquiring unit 6 acquires the delay quantity generated by the voice speed control process from the voice speed control unit 5b each time the process is executed, and accumulates these delay quantities, whereby the accumulated delay quantity may be obtained. The delay quantity acquiring unit 6 transfers the accumulated delay quantity at each point of time of processing to the voice speed determining unit 4b.

<Voice Speed Determining Unit>

Figure 9:
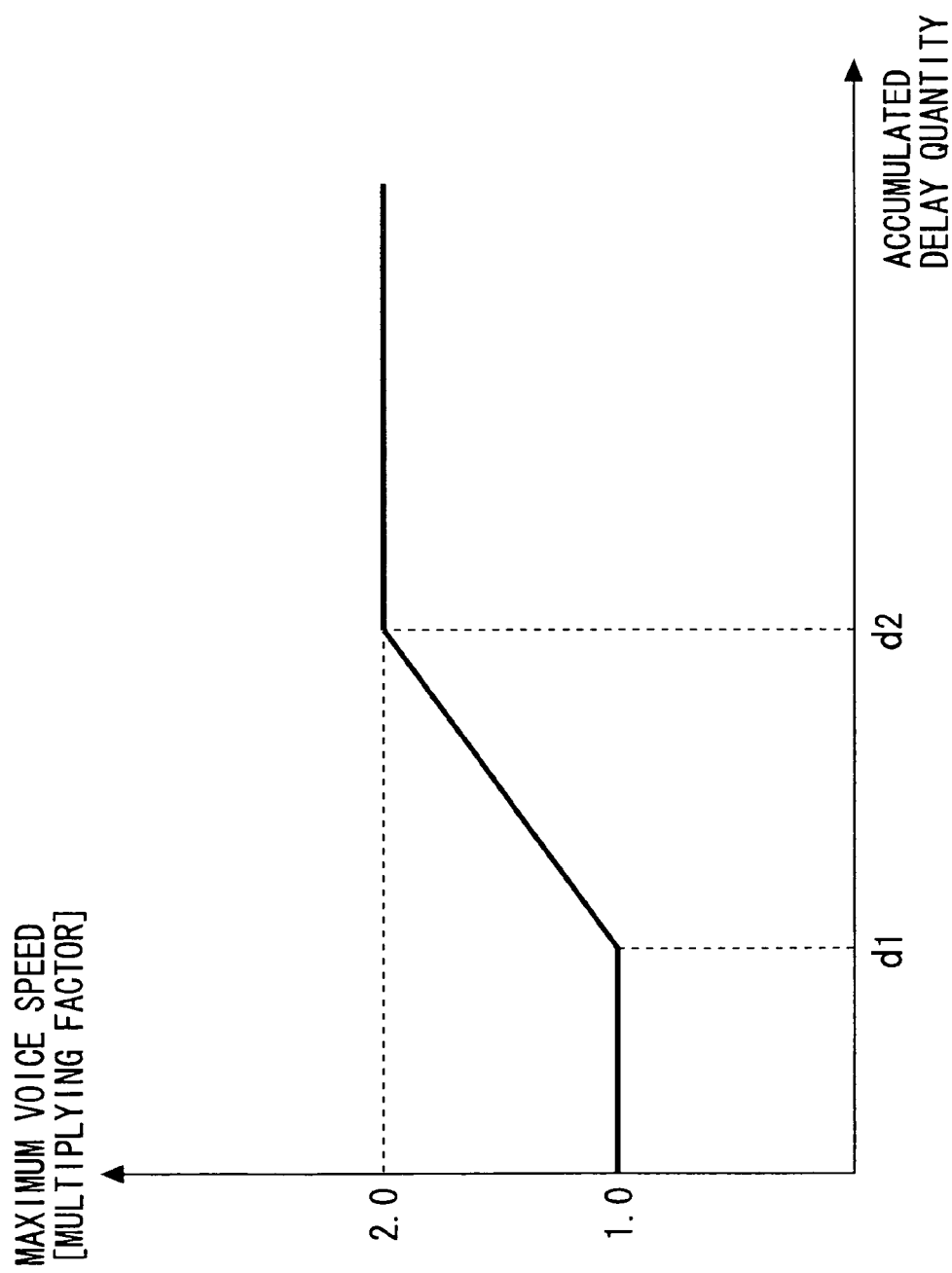
FIG. 9 is a graphic chart showing a relationship between an accumulated delay quantity and the voice speed.
Figure 10:
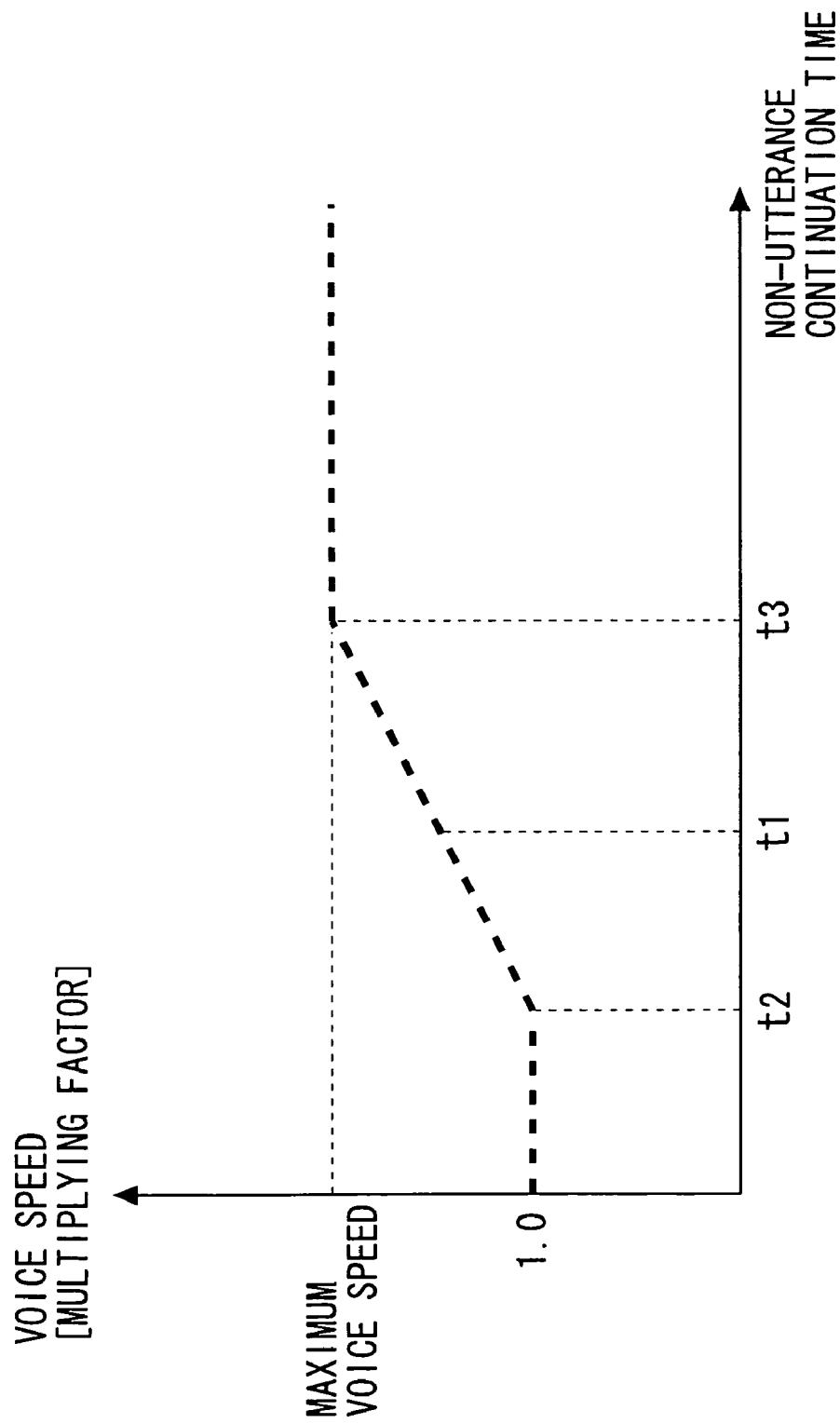
FIG. 10 is a graphic chart showing a relationship between non-utterance continuation time and the voice speed.
Figure 11:
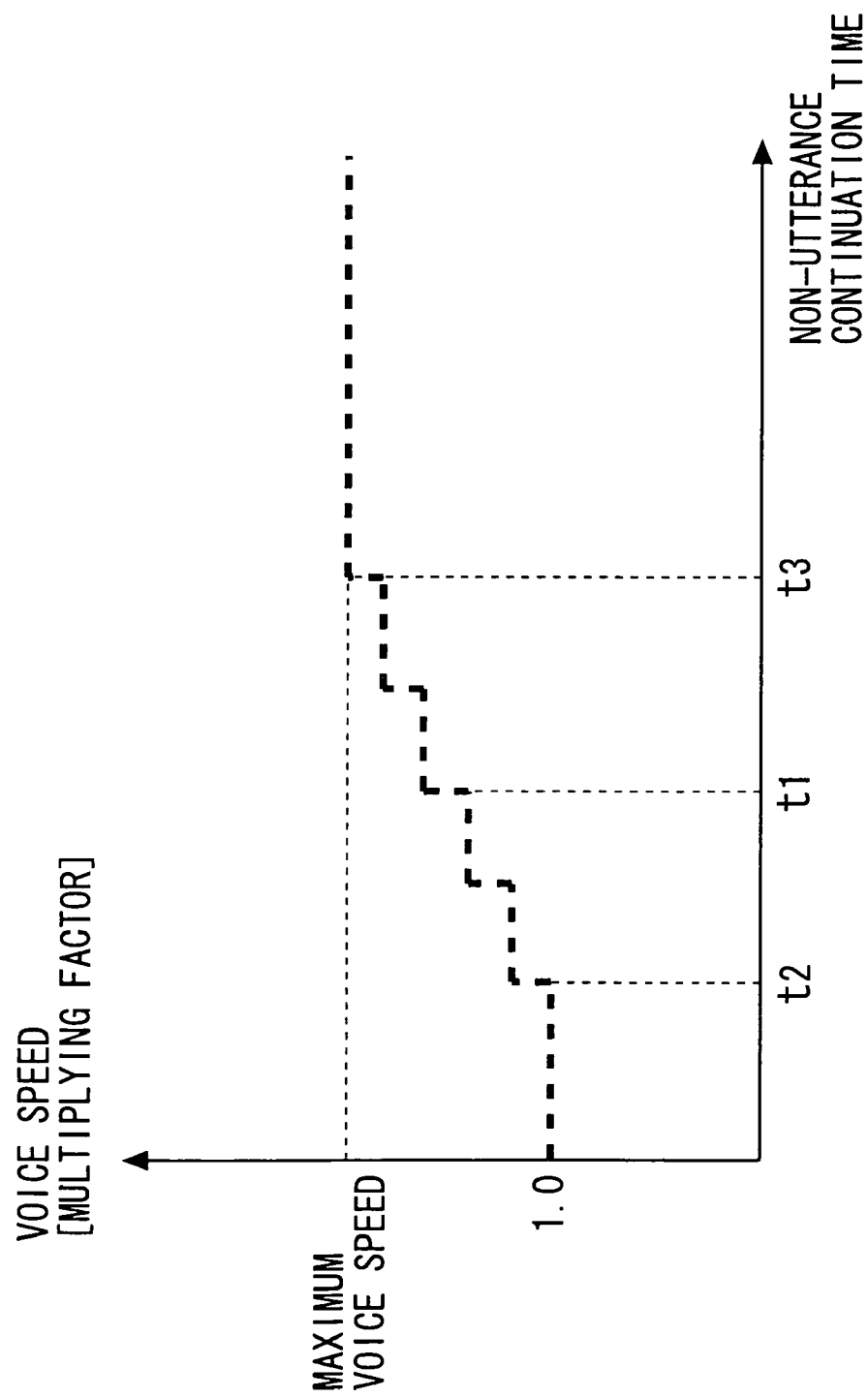
FIG. 11 is a graphic chart showing a relationship between the non-utterance continuation time and the voice speed.

The voice speed determining unit $4b$ is different from the voice speed determining unit $4a$ in terms of a point of determining, on the occasion of determining the voice speed in the non-utterance section, the voice speed on the basis of the non-utterance continuation time obtained by the continuation time calculating unit $3a$ and the accumulated delay quantity obtained by the delay quantity acquiring unit 6. FIG. 9 is a graphic chart showing a relationship between the accumulated delay quantity and the voice speed. The voice speed determining unit $4b$ determines, based on the accumulated delay quantity, a maximum voice speed. The voice speed determining unit $4b$ increases, if the accumulated delay quantity exists between the threshold value d1 and the threshold value d2, as shown in FIG. 9, the maximum voice speed according to a rise in the accumulated delay quantity. FIGS. 10 and 11 are graphic charts each showing a relationship between the non-utterance continuation time and the voice speed. The voice speed determining unit $4b$ determines, based on the maximum voice speed determined according to the accumulated delay quantity and on the non-utterance continuation time, the voice speed along the graphs as depicted in FIGS. 10 and 11. Namely, the voice speed determining unit $4b$ determines the voice speed so that the voice speed gets faster as the non-utterance continuation time gets longer, wherein the maximum voice speed determined based on the accumulated delay quantity is set as an upper limit.

OPERATIONAL EXAMPLE

Figure 12:
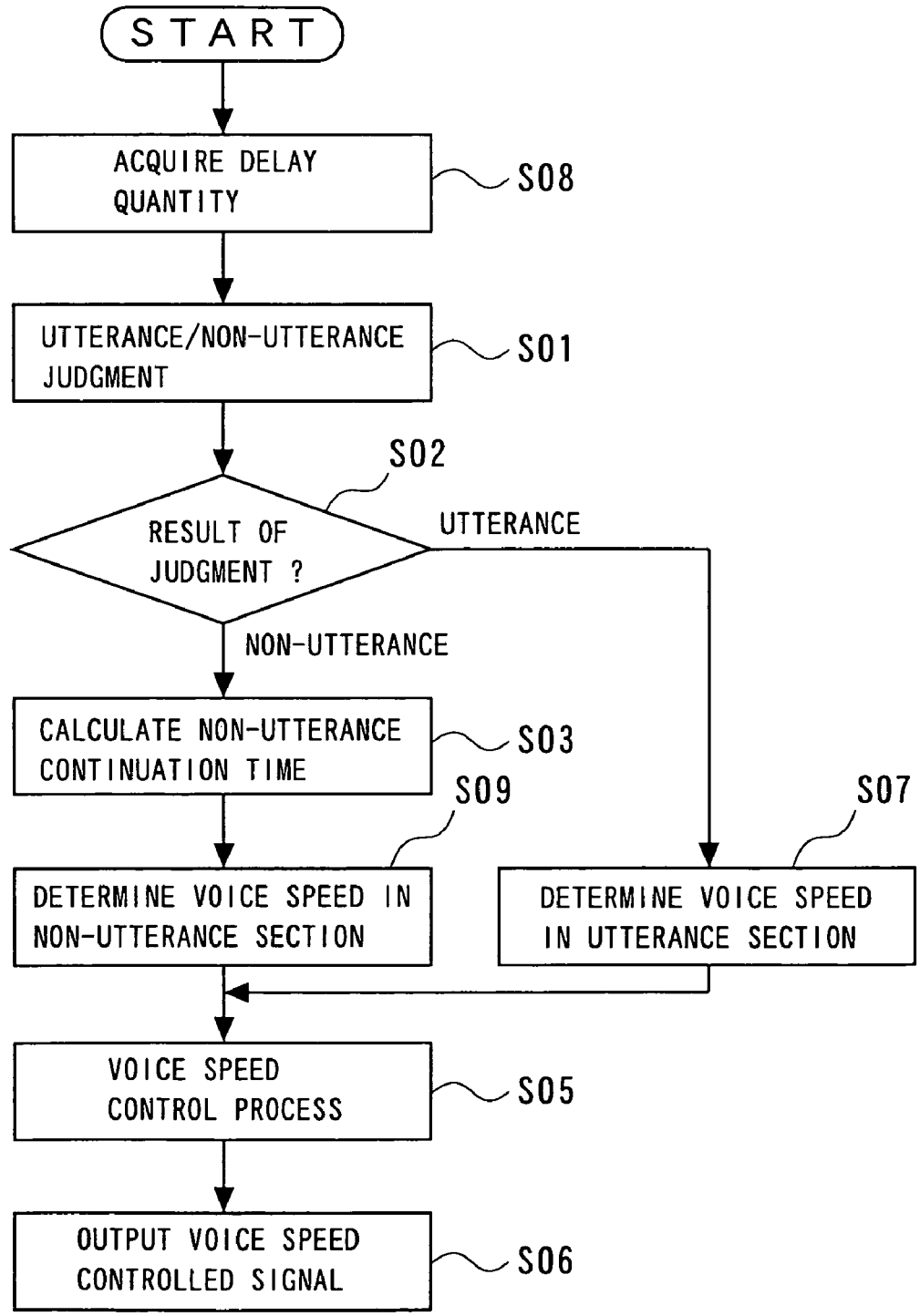
FIG. 12 is a flowchart showing an operational example in the second embodiment of the voice speed control apparatus.

FIG. 12 is a flowchart showing an operational example of the voice speed control apparatus $1b$. Note that in FIG. 12, the same processes as those shown in the flowchart in FIG. 5 are marked with the same reference symbols. Referring to FIG. 12, an explanation of the operational example of the voice speed control apparatus $1b$ will hereinafter be focused on the different processes from those of the voice speed control apparatus $1a$.

Upon a start of processing, to begin with, the input signals are inputted to the voice speed control apparatus $1b$, and the delay quantity acquiring unit 6 acquires the accumulated delay quantity at this point of time (S08). Thereafter, the utterance/non-utterance judging unit $2a$ makes the utterance/non-utterance judgment (S01). Then, after the continuation time calculating unit $3a$ has calculated the non-utterance continuation time (after S03), the voice speed determining unit $4b$ determines the voice speed in the non-utterance section on the basis of the accumulated delay quantity obtained by the delay quantity acquiring unit 6 and the non-utterance continuation time obtained by the continuation time calculating unit $3a$ (S09). After this process, as in the case of the voice speed control apparatus $1a$, the voice speed control unit $5b$ of the voice speed control apparatus $1b$ executes the processes in S05 and S06. Further, the process in a case where the result of the judgment by the utterance/non-utterance judging unit $2a$ shows the utterance, is the same as in the case of the voice speed control apparatus $1a$ (refer to S07)

[Operation/Effect]

One of the reasons why the voice speed control apparatus 1 increases the voice speed in the non-utterance section lies in obviating the delay occurred due to the control of decreasing the voice speed in the utterance section. Therefore, if almost no delay occurs, there is no necessity of increasing the voice speed in the non-utterance section. Hence, it is also effective to control the voice speed in the non-utterance section, corresponding to the accumulated delay quantity. According to such a point of view, the voice speed control apparatus $1b$ determines the maximum voice speed serving as a criterion for determining the voice speed in the non-utterance section, corresponding to an accumulated state of the delay quantities. This scheme being thus taken, it is possible to prevent the voice speed from being unnecessarily increased if the accumulated delay quantity is small. In other words, the vanishment of the voice elements, which is caused in the case of the small accumulated delay quantity, can be reduced more effectively than by the voice speed control apparatus $1a$.

MODIFIED EXAMPLE

The voice speed control apparatus $1b$ may be configured so that the continuation time calculating unit $3a$ does not calculate the continuation time in the non-utterance section, i.e., does not calculate the non-utterance continuation time. If configured in this way, the voice speed determining unit $4b$ determines the voice speed on the basis of only the accumulated delay quantity. To be specific, in this configuration, the voice speed determining unit $4b$ determines not the maximum voice speed based on the accumulated delay quantity but the voice speed based on the accumulated delay quantity in the graph shown in FIG. 9. For example, the determination of the voice speed can be actualized by setting a value along the axis of ordinate as the voice speed in the graph shown in FIG. 9.

Further, the voice speed control unit $5b$ in the voice speed control apparatus $1b$ may notify, after the processes in S05 and S06, the delay quantity acquiring unit 6 of the delay quantity.

Moreover, not the voice speed control unit $5b$ but the voice speed determining unit $4b$ may acquire the delay quantity and may notify the delay quantity acquiring unit 6 of the delay quantity.

Third Embodiment

[System Architecture]

Figure 13:
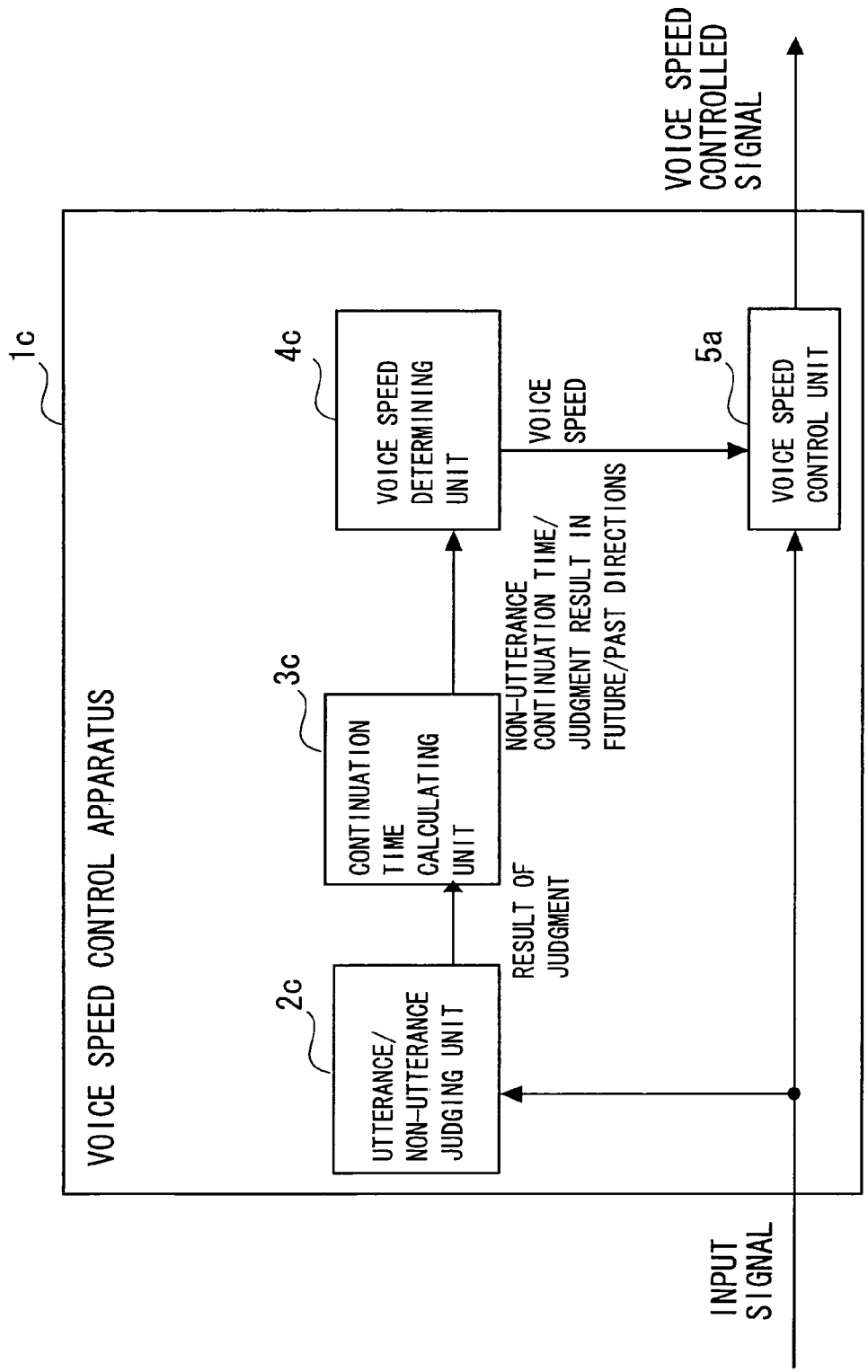
FIG. 13 is a diagram showing an example of function blocks in a third embodiment of a voice speed control apparatus.

Next, an example of a configuration of a voice speed control apparatus $1c$ will be explained by way of a third embodiment of the voice speed control apparatus 1. FIG. 13 is a diagram showing an example of function blocks of the voice speed control apparatus $1c$. The voice speed control apparatus $1c$ is different from the voice speed control apparatus $1a$ in terms of including an utterance/non-utterance judging unit $2c$ that replaces the utterance/non-utterance judging unit $2a$, a continuation time calculating unit $3c$ in place of the continuation time calculating unit $3a$, and a voice speed determining unit $4c$ as a substitute for the voice speed determining unit $4a$. Other components of the voice speed control apparatus $1c$ are basically the same as those of the voice speed control apparatus $1a$. Different points of the voice speed control apparatus $1c$ from the voice speed control apparatus $1a$ will hereinafter be described.

<Utterance/Non-Utterance Judging Unit>

Figure 14:
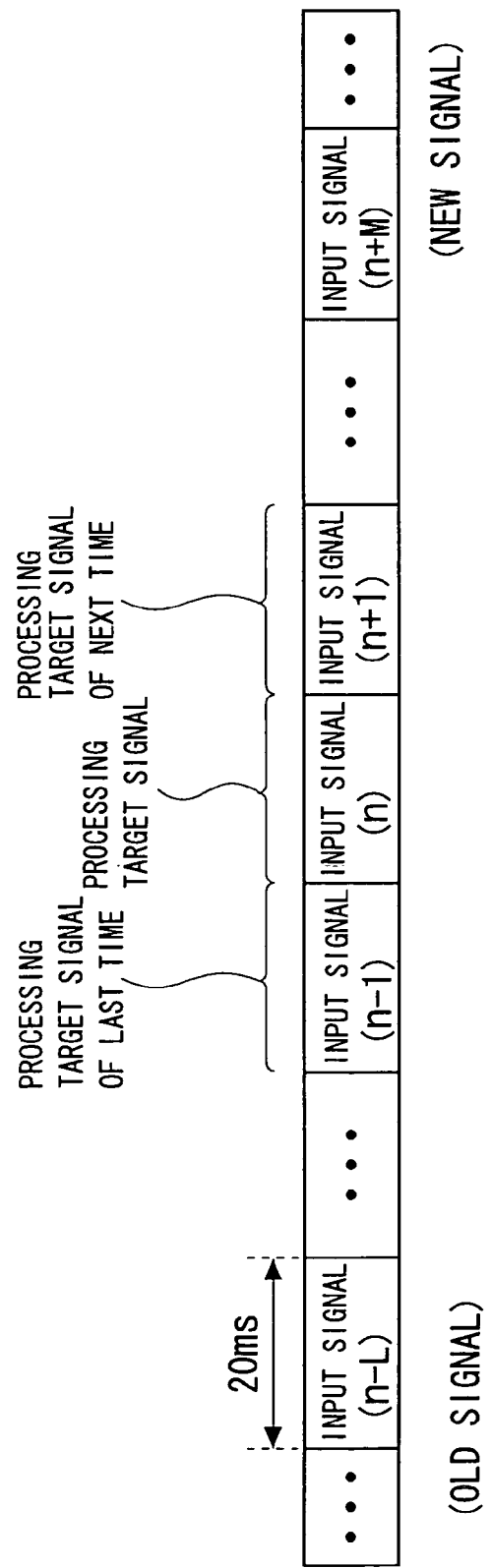
FIG. 14 is a diagram showing an example of a frame in which the utterance/non-utterance judging unit acquires a result of utterance/non-utterance judgment in the third embodiment.

The utterance/non-utterance judging unit $2c$ is different from the utterance/non-utterance judging unit $2a$ in terms of acquiring results of the utterance/non-utterance judgments about, in addition to the processing target frame, frames (frames in a past direction) anterior to the processing target frame and frames (frames in a future direction) posterior thereto. FIG. 14 is a diagram showing an example of the frames about which the utterance/non-utterance judging unit $2c$ acquires the results of the utterance/non-utterance judgments. The utterance/non-utterance judging unit $2c$ acquires the results of the utterance/non-utterance judgments about the processing target frame, L-pieces of frames anterior to this processing target frame and M-pieces of frames posterior thereto. Namely, the utterance/non-utterance judging unit 2c acquires the results of the utterance/non-utterance judgments about the (1+L+M) pieces of frames. The utterance/non-utterance judging unit 2c may acquire the results of the utterance/non-utterance judgments about these respective frames by executing the utterance/non-utterance judgment each time. Moreover, the utterance/non-utterance judging unit 2c may acquire the results of the utterance/non-utterance judgments about the respective frames in a way that stores the results of the judgments about the frames already undergoing the utterance/non-utterance judgments and executes the utterance/non-utterance judgments about only the frames that need carrying out newly the utterance/non-utterance judgments. The utterance/non-utterance judging unit 2c transfers the results of the utterance/non-utterance judgments about the respective frames to the continuation time calculating unit 3c.

<Continuation Time Calculating Unit>

The continuation time calculating unit 3c acquires, if the utterance/non-utterance judging unit 2c judges that the processing target frame is a non-utterance frame, the number of frames (frame count) judged to be the non-utterance frames consecutively from the processing target frame in the past direction and the number of frames judged to be the non-utterance frames consecutively in the future direction.

Specifically, the continuation time calculating unit 3c refers to, if in the past direction, the results of the utterance/non-utterance judgments about an input signal (n−1), an input signal (n−2), an input signal (n−3) sequentially down to an input signal (n−L), and acquires the number of frames judged to be the non-utterance frames consecutively from the processing target frame. In the case of the future direction, the continuation time calculating unit 3c refers to the results of the utterance/non-utterance judgments about an input signal (n+1), an input signal (n+2), an input signal (n+3) sequentially up to an input signal (n+M), and acquires the number of frames judged to be the non-utterance frames consecutively from the processing target frame. Then, the continuation time calculating unit 3c acquires, based on the acquired frame count, obtains the lengths of non-utterance continuation time respective in the past direction and in the future direction from the processing target frame. The continuation time calculating unit 3c transfers the non-utterance continuation time in the past direction from the processing target frame and the non-utterance continuation time in the future direction from the processing target frame, to the voice speed determining unit 4c.

<Voice Speed Determining Unit>

The voice speed determining unit 4c is different from the voice speed determining unit 4a in terms of determining, on such an occasion that the voice speed in the non-utterance section is determined, the voice speed on the basis of the non-utterance continuation time in the past direction from the processing target frame and the non-utterance continuation time in the future direction. The voice speed determining unit 4c determines, if the non-utterance continuation time in the future direction is shorter than a predetermined threshold value, the voice speed on the basis of the non-utterance continuation time in the future direction. At this time, the voice speed determining unit 4c determines the voice speed so that the voice speed gets slower as the non-utterance continuation time in the future direction gets shorter. The following is an explanation of a specific process of the voice speed determining unit 4c.

Figure 15A:
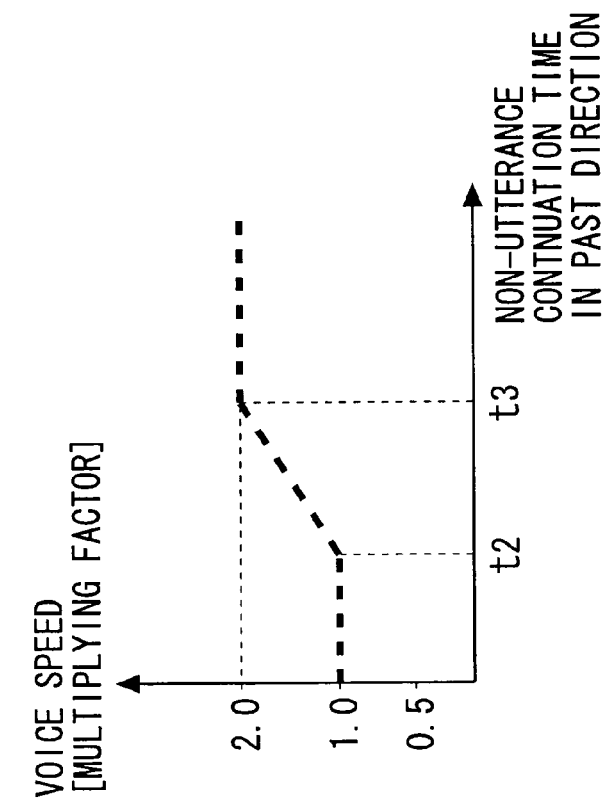
FIGS. 15A and 15B are graphs showing a relationship between the voice speed determined by the voice speed determining unit and the non-utterance continuation time in the third embodiment.
Figure 15B:
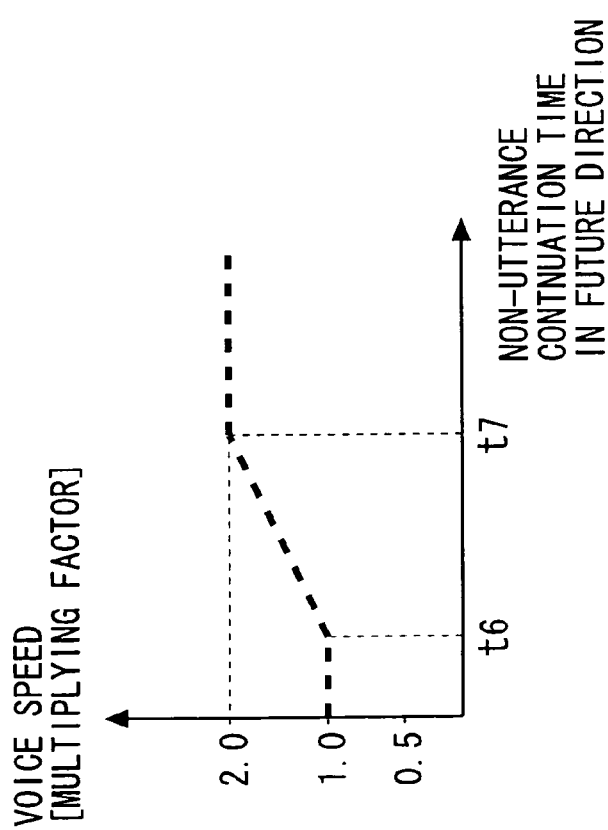

FIG. 15 illustrates graphs each showing a relationship between the voice speed determined by the voice speed determining unit 4c and the non-utterance continuation time. FIG. 15(a) is the graph showing the relationship between the non-utterance continuation time in the future direction and the voice speed, and FIG. 15(b) is the graph showing the relationship between the non-utterance continuation time in the past direction and the voice speed. The voice speed determining unit 4c, at first, acquires the voice speed along the graph shown in FIG. 15(a) on the basis of the non-utterance continuation time in the future direction. The voice speed determining unit 4c, if the voice speed at this time is less than a 2-fold speed, in other words, if the non-utterance continuation time in the future direction is smaller than a threshold value "t7", determines the voice speed at this time as a voice speed in the processing target frame. While on the other hand, the voice speed determining unit 4c, if the voice speed at this time is the 2-fold speed, in other words, if the non-utterance continuation time in the future direction is larger than the threshold value "t7", acquires the voice speed along the graph shown in FIG. 15(b) on the basis of the non-utterance continuation time further in the past direction. Then, the voice speed determining unit 4c determines the voice speed acquired based on the non-utterance continuation time in the past direction as a voice speed in the processing target frame.

The voice speed determining unit 4c may execute the process as below. To start with, the voice speed determining unit 4c judges whether the non-utterance continuation time in the future direction is equal to or greater than the threshold value "t7". Next, the voice speed determining unit 4c, if the non-utterance continuation time in the future direction is less than the threshold value "t7", determines the voice speed by use of the non-utterance continuation time in the future direction along the graph in FIG. 15(a). Then, the voice speed determining unit 4c, if the non-utterance continuation time in the future direction is equal to or greater than the threshold value "t7", determines the voice speed by use of the non-utterance continuation time in the past direction along the graph in FIG. 15(b).

The voice speed determining unit 4c may carry out the process in the following manner. At first, the voice speed determining unit 4c determines the voice speed by use of the non-utterance continuation time in the future direction along the graph in FIG. 15(a). Next, the voice speed determining unit 4c determines the voice speed by use of the non-utterance continuation time in the past direction along the graph in FIG. 15(b). The voice speed determining unit 4c determines the slower of these two voice speeds as a voice speed in the processing target frame.

The voice speed determining unit 4c is characterized by the piecemeal reduction of the voice speed when shifting to the utterance section from the non-utterance section in a way that executes the process by use of the non-utterance continuation time in the future direction. Accordingly, without being limited to the method described above, another method of attaining the piecemeal reduction of the voice speed in a way that judges timing of the shift to the utterance section from the non-utterance section by use of the non-utterance continuation time in the future direction, may also be applied to the voice speed determining unit 4c.

OPERATIONAL EXAMPLE

Figure 16:
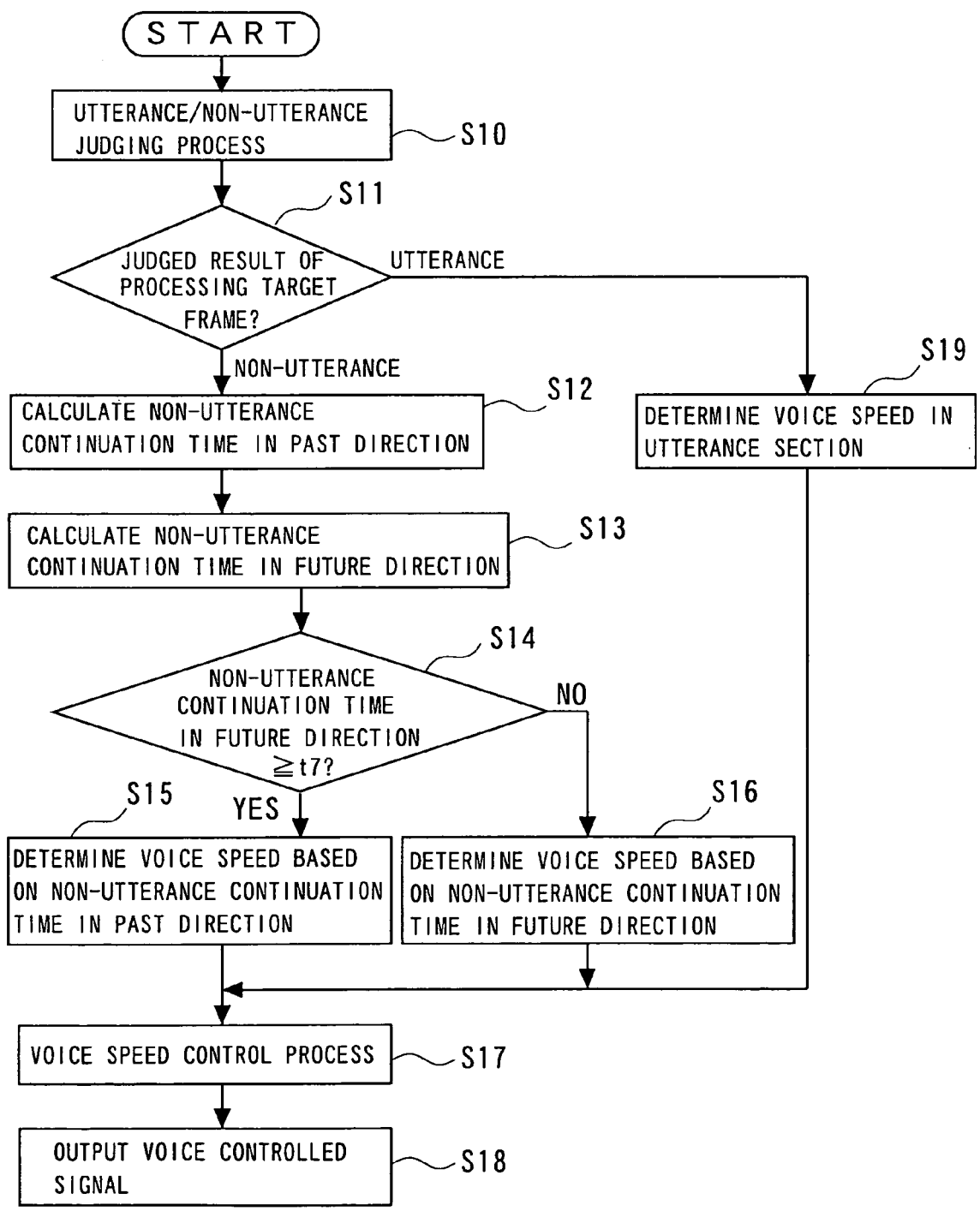
FIG. 16 is a flowchart showing an operational example in the third embodiment of the voice speed control apparatus.

FIG. 16 is a flowchart showing an operational example of the voice speed control apparatus 1c. FIG. 16 shows the flowchart in a case where a method of judging whether or not the process is executed by employing the non-utterance continuation time in any one of the future direction and the past direction on the basis of the threshold value "t7", is applied to the voice speed determining unit 4c. An operational example of the voice speed determining unit 4c will hereinafter be described with reference to FIG. 16.

Upon a start of processing, to begin with, the input signals are inputted to the voice speed control apparatus 1c. Then, the utterance/non-utterance judging unit 2c makes the utterance/non-utterance judgments about the processing target frame and the respective frames positioned anterior and posterior to this processing target frame in the input signals (S10). As a result of these judgments, when judging that the processing target frame is the non-utterance frame (S11: non-utterance), the continuation time calculating unit 3c calculates the non-utterance continuation time in the past direction and the non-utterance continuation time in the future direction (S12, S13). Next, the voice speed determining unit 4c judges whether the non-utterance continuation time in the future direction is equal to or greater than the threshold value "t7" (longer than the threshold value "t7" or not). If this value is equal to or larger than the threshold value "t7" (S14: YES), the voice speed determining unit 4c determines the voice speed along the graph shown in FIG. 15(b) by use of the non-utterance continuation time in the past direction (S15). While on the other hand, if this value is less than the threshold value "t7" (S14: NO), the voice speed determining unit 4c determines the voice speed along the graph shown in FIG. 15(a) by use of the non-utterance continuation time in the future direction (S16). On the other hand, in the utterance/non-utterance judgment, if the processing target frame is judged to be the utterance frame (S11: utterance), the voice speed determining unit 4c determines the voice speed as a voice speed in the utterance section (S19). Then, the voice speed control unit 5a executes the voice speed control process about the processing target frame according to the voice speed determined by the voice speed determining unit 4c (S17), and outputs a voice speed controlled signal (S18).

[Operation/Effect]

Figure 17:
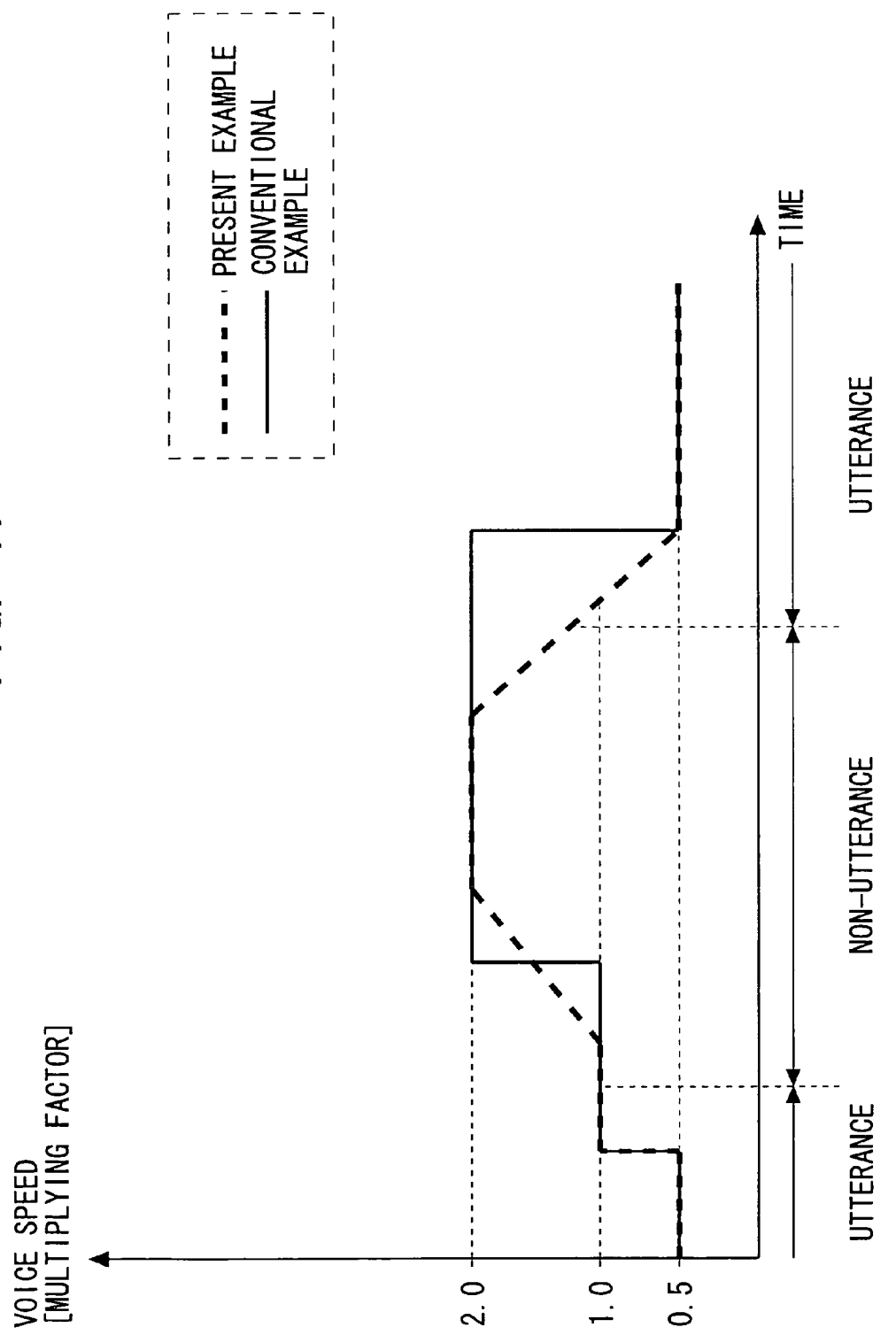
FIG. 17 is a graphic chart showing an example of how the voice speed is controlled in the third embodiment of the voice speed control apparatus.

FIG. 17 is a graphic chart showing an example of how the voice speed control apparatus 1c controls the voice speed. In the voice speed control apparatus 1c, the voice speed in the non-utterance section is determined based on the non-utterance continuation time in the future direction as well as on the non-utterance continuation time in the past direction. To be specific, the voice speed determining unit 4c determines the voice speed so that the voice speed gets slower as the non-utterance continuation time in the future direction gets shorter. Hence, the voice speed in the non-utterance section close to the utterance section is controlled not in a fast-reading status but as a voice speed that is, e.g., a 1-fold normal voice speed or as slow as a 0.5-fold voice speed. It is therefore possible to prevent or reduce the adverse influence (the vanishment of the voice elements) if misjudged to be unuttered in the utterance starting points.

MODIFIED EXAMPLE

The voice speed control apparatus 1c may also be configured to further include the delay quantity acquiring unit 6. If configured in this way, the voice speed determining unit 4c of the voice speed control apparatus 1c may determine the maximum voice speed on the basis of the accumulated delay quantity as done by the voice speed determining unit 4b. Then, the voice speed determining unit 4c, on the occasion of determining the voice speed on the basis of the non-utterance continuation time in the past direction or the non-utterance continuation time in the future direction, may determine the voice speed on the basis of the maximum voice speed.

Fourth Embodiment

[System Architecture]

Figure 18:
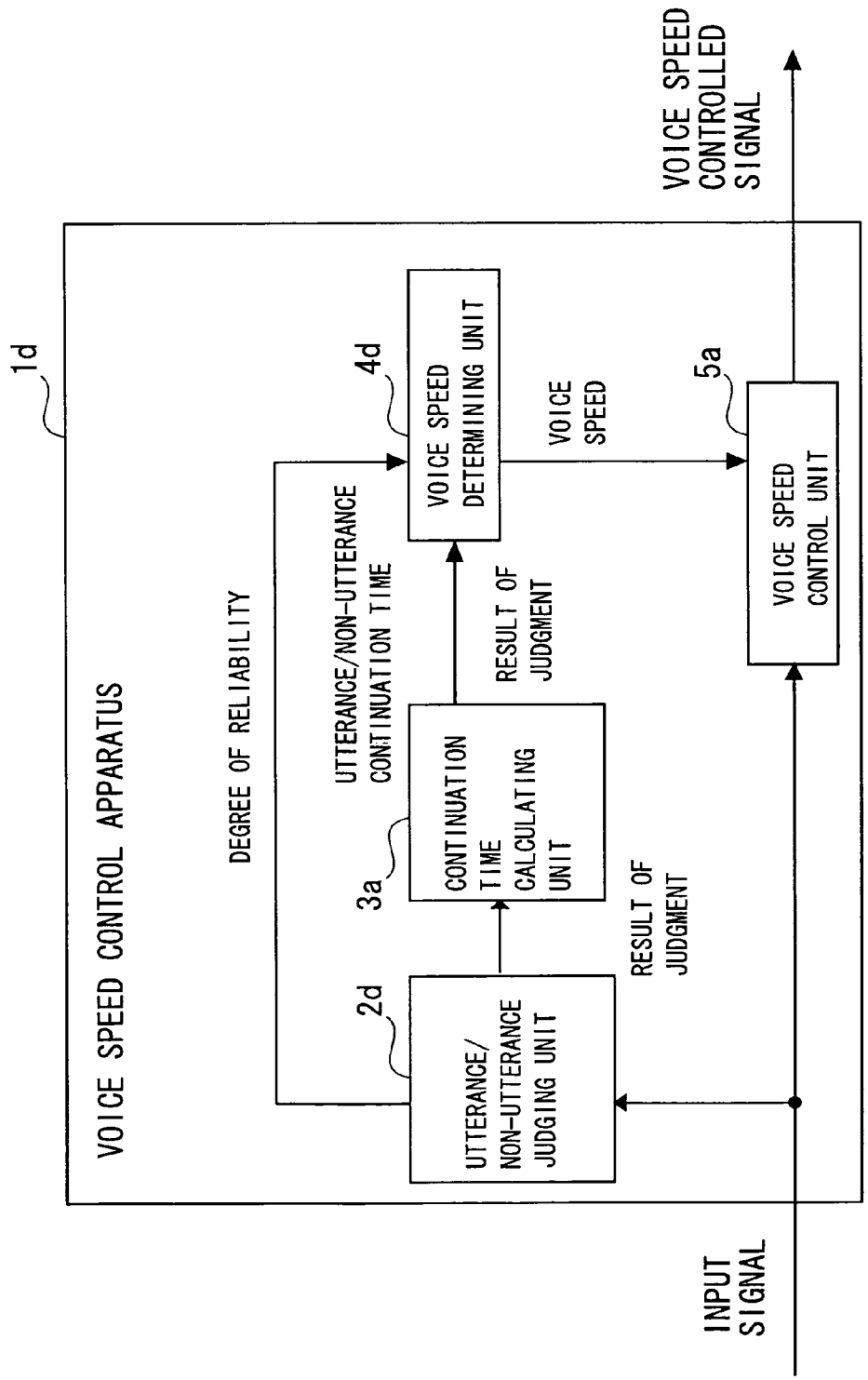
FIG. 18 is a diagram showing an example of function blocks in a fourth embodiment of the voice speed control apparatus.

Next, an example of a configuration of a voice speed control apparatus 1d will be explained by way of a fourth embodiment of the voice speed control apparatus 1. FIG. 18 is a diagram showing an example of function blocks of the voice speed control apparatus 1d. The voice speed control apparatus 1d is different from the voice speed control apparatus 1a in terms of including an utterance/non-utterance judging unit 2d that replaces the utterance/non-utterance judging unit 2a, and a voice speed determining unit 4d in place of the voice speed determining unit 4a. Different points of the voice speed control apparatus 1d from the voice speed control apparatus 1a will hereinafter be described.

<Utterance/Non-Utterance Judging Unit>

The utterance/non-utterance judging unit 2d is different from the utterance/non-utterance judging unit 2a in terms of not only judging, in the utterance/non-utterance judgment, whether the processing target frame is the utterance frame or the non-utterance frame but also obtaining a degree of reliability on the judgment if judged to be unuttered. The utterance/non-utterance judging unit 2d, through the same process as by the utterance/non-utterance judging unit 2d, subtracts an average power value when unuttered in the past signals from the power value of the input signal (n). Then, the utterance/non-utterance judging unit 2d obtains, based on a result of this subtraction, a value (the degree of reliability) representing the reliability. FIG. 19 is a table showing an example of a relationship between the degree of reliability and the result of the subtraction. The utterance/non-utterance judging unit 2d obtains the degree of reliability on the basis of the result of the subtraction made above and the table in FIG. 19. Then, the utterance/non-utterance judging unit 2d transfers the obtained degree of reliability to the voice speed determining unit 4d.

<Voice Speed Determining Unit>

The voice speed determining unit 4d is more similar in its construction to the voice speed determining unit 4b than the voice speed determining unit 4a, and is therefore explained by making a comparison with the voice speed determining unit 4b. The voice speed determining unit 4d is different from the voice speed determining unit 4b in terms of determining the maximum voice speed on the basis of not the accumulated delay quantity but the degree of reliability. The voice speed determining unit 4d determines the maximum voice speed to be faster as the degree of reliability on the judgment made about the non-utterance by the utterance/non-utterance judging unit 2d becomes higher, and determines the maximum voice speed to be slower as the degree of reliability becomes lower. FIG. 20 is a table showing an example of a relationship between the degree of reliability and the maximum voice speed. The voice speed determining unit 4d determines the maximum voice speed on the basis of, e.g., the degree of reliability received from the utterance/non-utterance judging unit 2d and the table shown in FIG. 20. Then, the voice speed determining unit 4d, in the same way as by the voice speed determining unit 4b, determines the voice speed on the basis of the maximum voice speed and the non-utterance continuation time along, e.g., the graphs illustrated in FIGS. 10 and 11.

OPERATIONAL EXAMPLE

Figure 21:
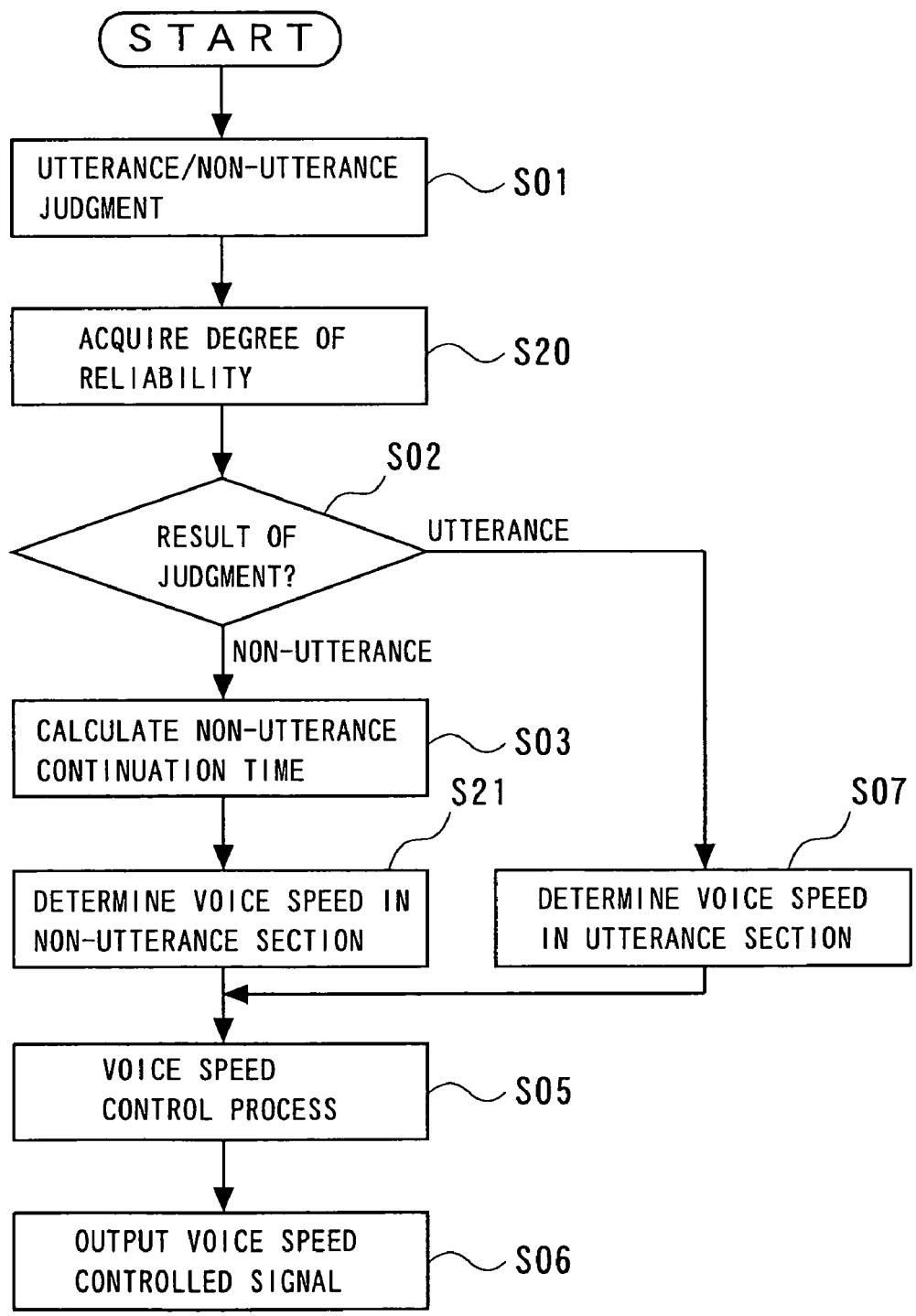
FIG. 21 is a flowchart showing an operational example in the fourth embodiment of the voice speed control apparatus.

FIG. 21 is a flowchart showing an operational example of the voice speed control apparatus 1d. Note that the same processes in FIG. 21 as those shown in the flowchart in FIG.

5 are marked with the same reference symbols as those in FIG. 5. Referring to FIG. 21, a description of the operational example of the voice speed control apparatus 1d will hereinafter be focused on different processes from those in the voice speed control apparatus 1a.

Upon a start of processing, the utterance/non-utterance judging unit 2d, after making the utterance/non-utterance judgment (after S01), obtains the degree of reliability on this judgment (S20). At this time, the utterance/non-utterance judging unit 2d may be constructed so as not to obtain the degree of reliability in the case of making the utterance judgment.

Then, after the continuation time calculating unit 3a has calculated the non-utterance continuation time (after S03), the voice speed determining unit 4d determines the voice speed in the non-utterance section on the basis of the degree of reliability obtained by the utterance/non-utterance judging unit 2d and the non-utterance continuation time acquired by the continuation time calculating unit 3a (S21). After this process, in the same way as in the case of the voice speed control apparatus 1a, the voice speed control unit 5a of the voice speed control apparatus 1d executes the processes in S05 and S06. Further, if the result of the judgment made by the utterance/non-utterance judging unit 2d shows the utterance, the process is the same as in the case of the voice speed control apparatus 1a (refer to S07).

[Operation/Effect]

In the voice speed control apparatus 1d, the maximum voice speed is determined based on the degree of reliability on the judgment when the utterance/non-utterance judging unit 2d makes the non-utterance judgment. To be specific, in the voice speed control apparatus 1d, the maximum voice speed gets faster as the degree of reliability on the non-utterance judgment made by the utterance/non-utterance judging unit 2d gets higher, and the maximum voice speed gets slower as the degree of reliability gets lower. Hence, if the degree of reliability on the non-utterance judgment is low, i.e., if there might be a possibility of its being the utterance, the adverse influence as of a skip of voice element (a missing voice element) in the case of the misjudgment can be reduced by restraining low the maximum voice speed. By contrast, if the degree of reliability on the non-utterance judgment is high, i.e., if there is a low possibility of its being the utterance, the maximum voice speed is set high, whereby the priority is given to setting the voice speed high rather than reducing the adverse influence caused by the misjudgment, and the accumulation of the delays can be effectively decreased.

MODIFIED EXAMPLE

The voice speed control apparatus 1d may also be configured to further include the delay quantity acquiring unit 6 used in the second embodiment. If thus configured, the voice speed determining unit 4d may be constructed so as to determine the maximum voice speed on the basis of not only the degree of reliability but also the accumulated delay quantity. For instance, the voice speed determining unit 4d may determine the maximum voice speed on the basis of a table consisting of three items (fields) of information such as the degree of reliability, the accumulated delay quantity and the maximum voice speed.

Fifth Embodiment

[System Architecture]

Figure 22:
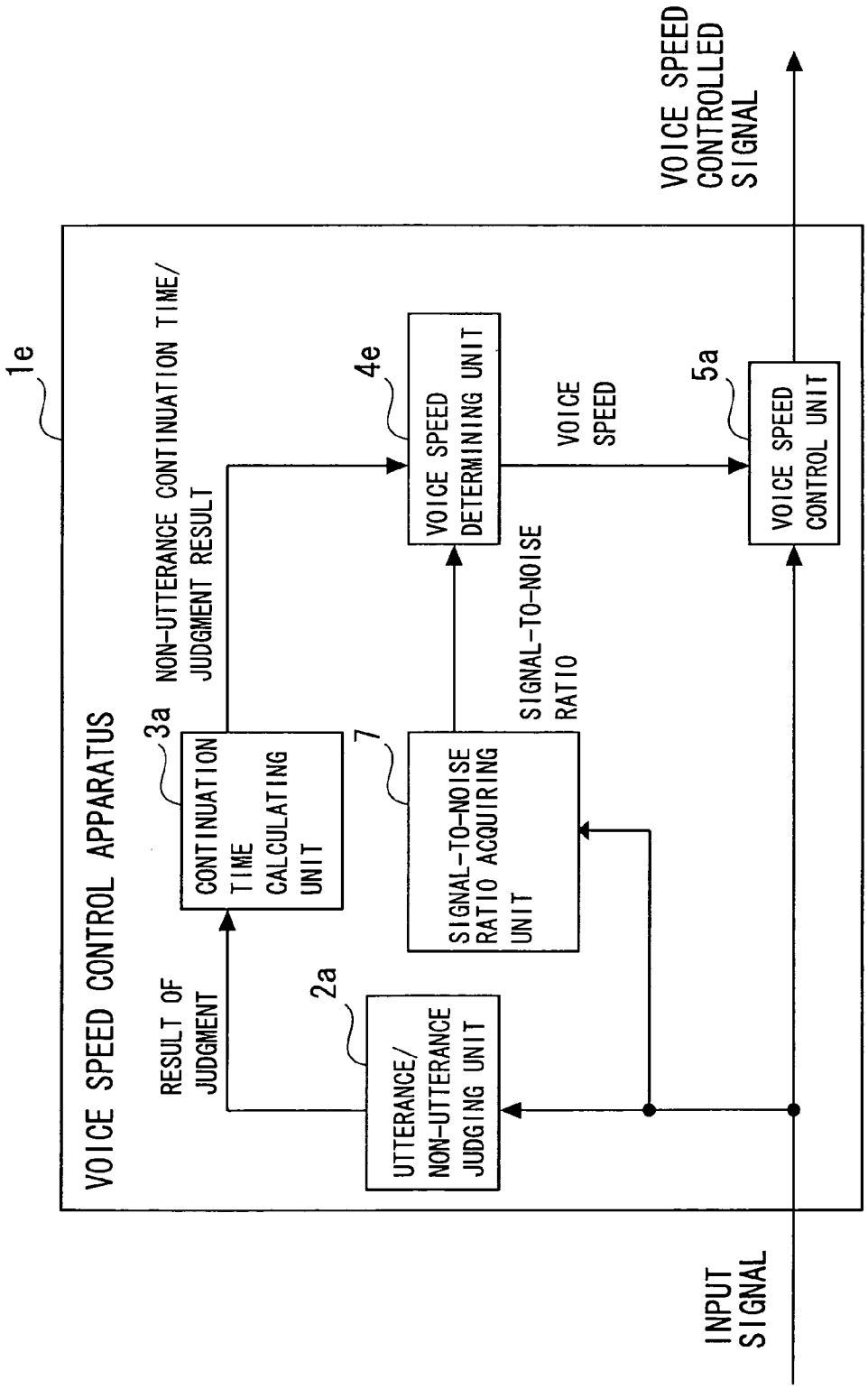
FIG. 22 is a diagram showing an example of function blocks in a fifth embodiment of the voice speed control apparatus.

Next, an example of a configuration of a voice speed control apparatus 1e will be explained by way of a fifth embodiment of the voice speed control apparatus 1. FIG. 22 is a diagram showing an example of function blocks of the voice speed control apparatus 1e. The voice speed control apparatus 1e is different from the voice speed control apparatus 1a in terms of including a voice speed determining unit 4e in place of the voice speed determining unit 4a, and further including a signal-to-noise ratio acquiring unit 7. Other components of the voice speed control apparatus 1e are basically the same as those of the voice speed control apparatus 1a. Different points of the voice speed control apparatus 1e from the voice speed control apparatus 1a will hereinafter be explained.

<Signal-to-Noise Ratio Acquiring Unit>

The signal-to-noise ratio acquiring unit 7 acquires a signal-to-noise ratio (SN ratio) with respect to the processing target frame of the utterance/non-utterance judging unit 2a in the input signals inputted to the voice speed control apparatus 1e. Any type of technology for acquiring the SN ratio can be applied to the signal-to-noise ratio acquiring unit 7. An explanation of a specific process for acquiring the SN ratio is omitted. The signal-to-noise ratio acquiring unit 7 transfers the acquired SN ratio to the voice speed determining unit 4e.

<Voice Speed Determining Unit>

Figure 23:
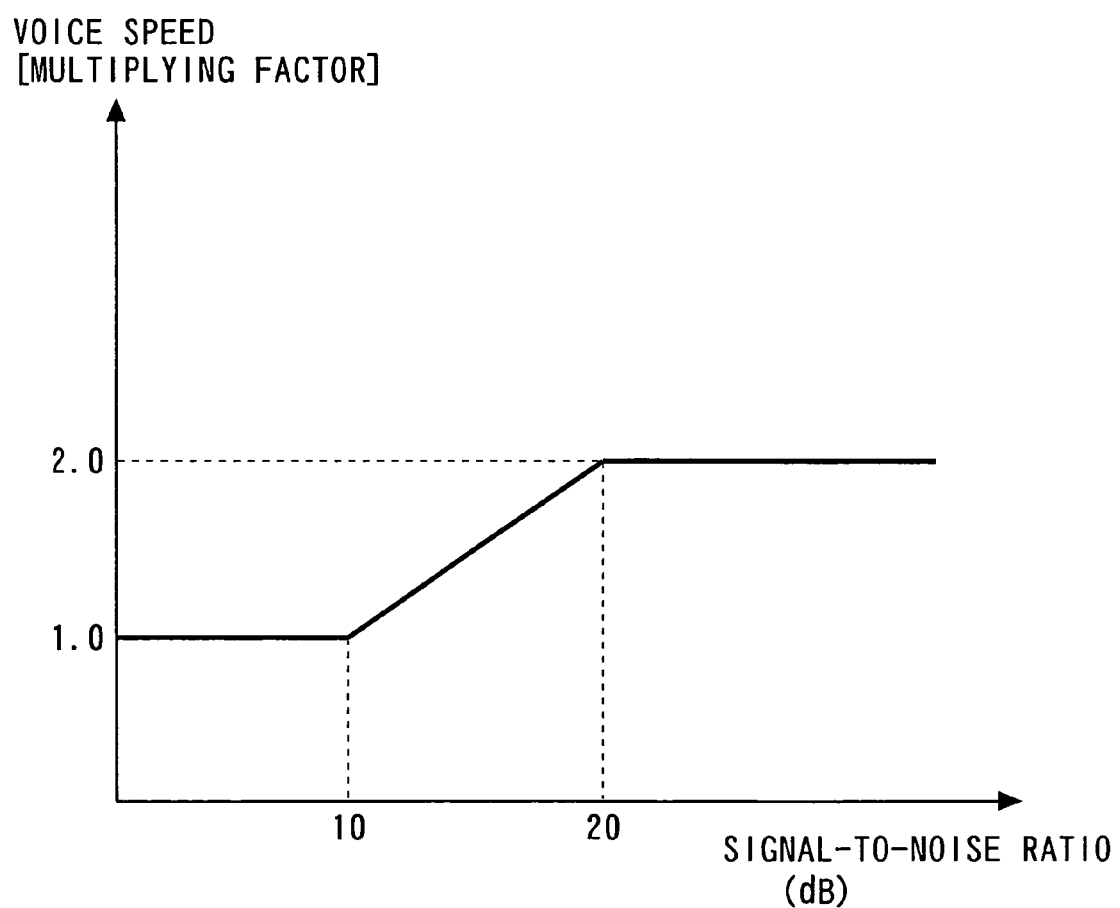
FIG. 23 is a graph showing a relational example between a signal-to-noise ratio and the maximum voice speed.

The voice speed determining unit 4e is more similar in its construction to the voice speed determining unit 4b than the voice speed determining unit 4a, and hence the explanation of the voice speed determining unit 4e will be made by comparing with the voice speed determining unit 4b. The voice speed determining unit 4e is different from the voice speed determining unit 4b in terms of determining the maximum voice speed on the basis of not the accumulated delay quantity but the SN ratio. The voice speed determining unit 4e determines that the maximum voice speed is set higher as the SN ratio acquired by the signal-to-noise ratio acquiring unit 7 gets higher, and determines that the maximum voice speed is set lower as the SN ratio becomes lower. FIG. 23 is a graph showing an example of a relationship between the SN ratio and the maximum voice speed. The voice speed determining unit 4e determines the maximum voice speed on the basis of, for example, the SN ratio received from the signal-to-noise ratio acquiring unit 7 and the graph illustrated in FIG. 23. Then, the voice speed determining unit 4e, in the same way as by the voice speed determining unit 4b, determines the voice speed on the basis of the maximum voice speed and the non-utterance continuation time along, e.g., the graphs shown in FIGS. 10 and 11.

OPERATIONAL EXAMPLE

Figure 24:
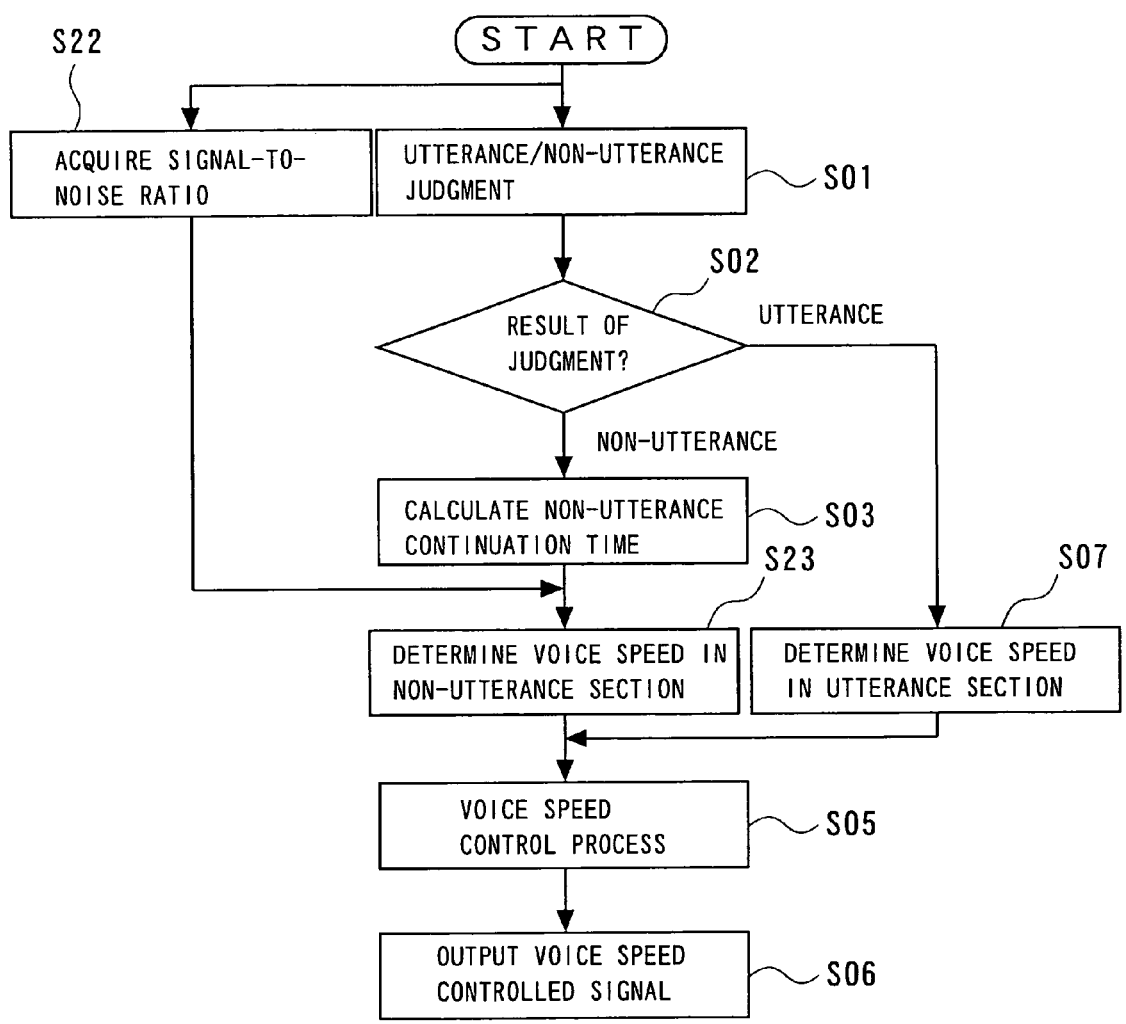
FIG. 24 is a flowchart showing an operational example in the fifth embodiment of the voice speed control apparatus.
Figure 25:
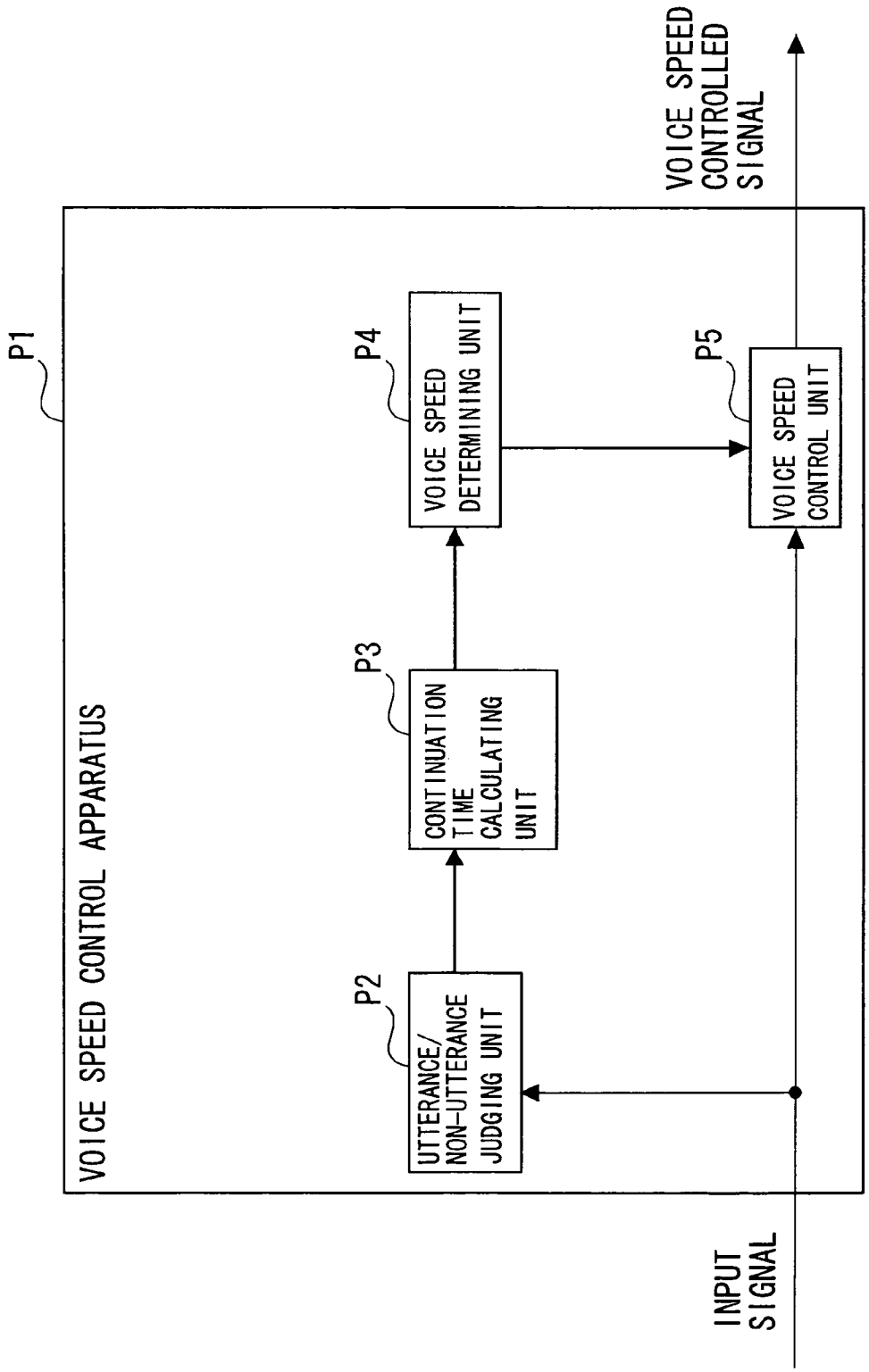
FIG. 25 is a diagram showing an example of function blocks of a conventional voice speed control apparatus.
Figure 26:
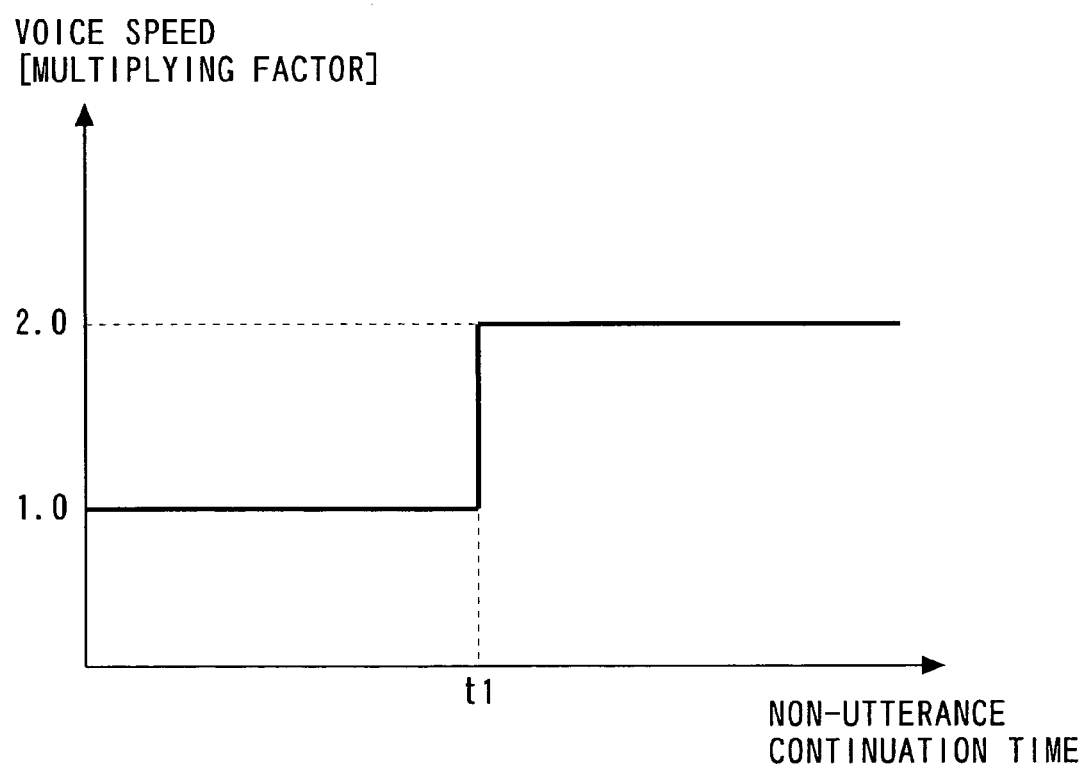
FIG. 26 is an explanatory graphic chart of a conventional mechanism for controlling the voice speed.
Figure 27:
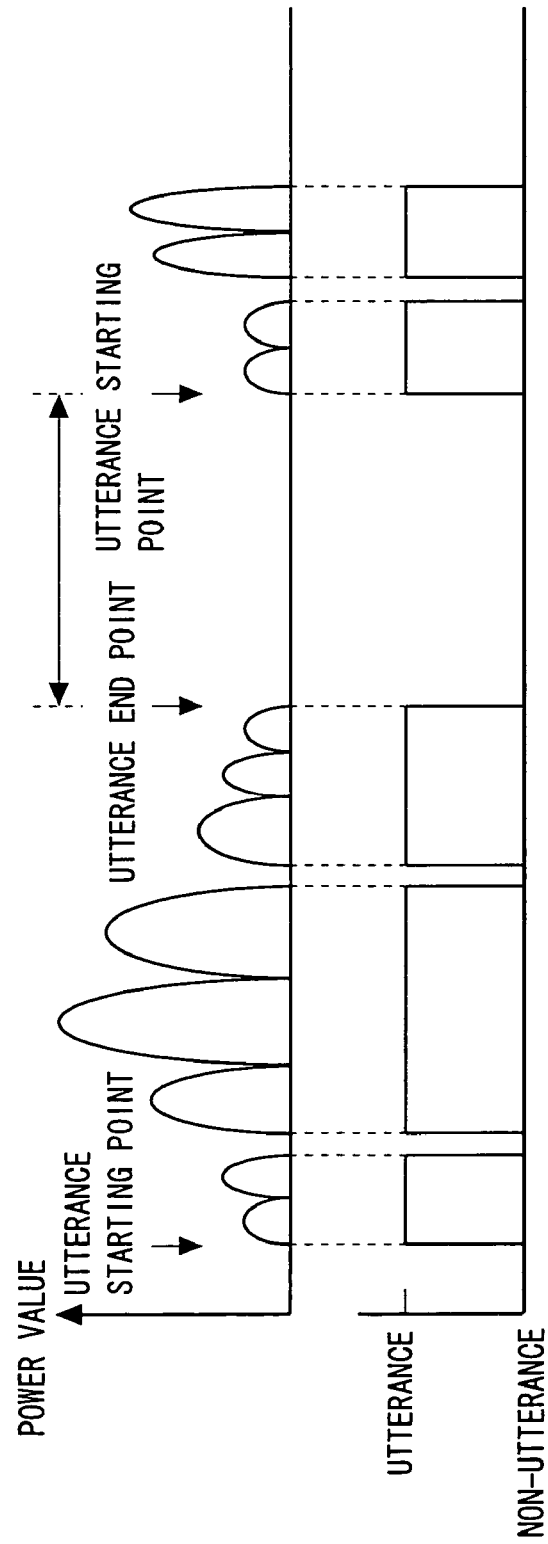
FIG. 27 is a graph showing an example of an input voice under an environment with no noise.
Figure 28:
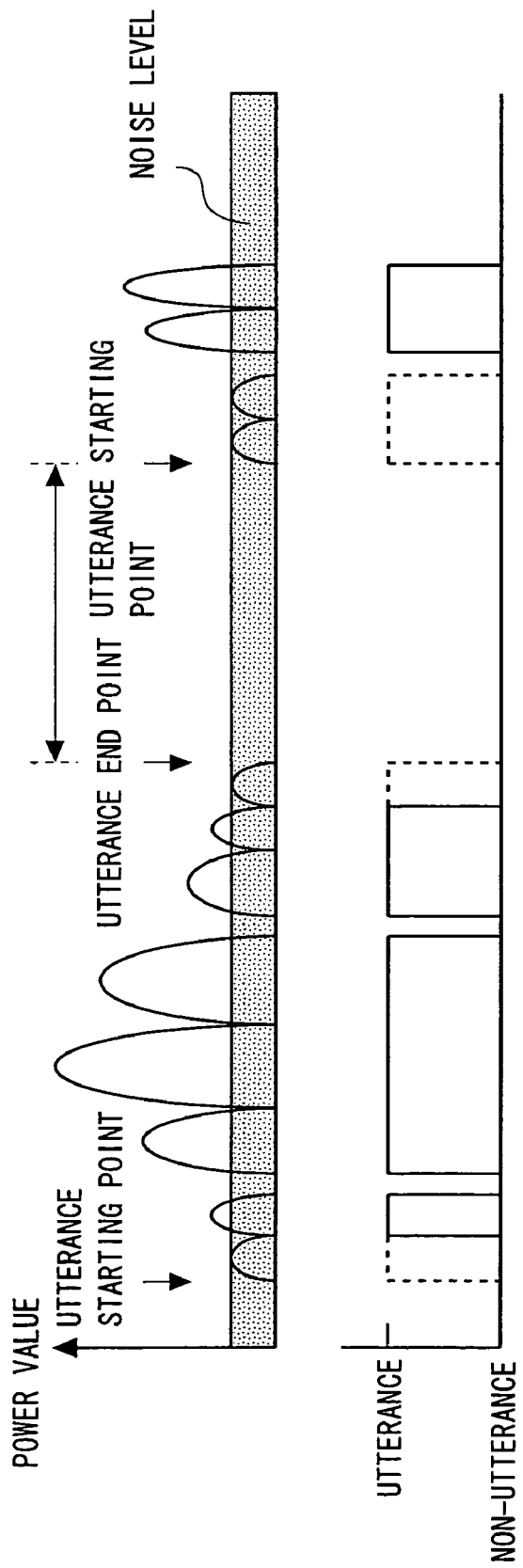
FIG. 28 is a graph showing an example of then input voice under an environment with a noise.
Figure 29A:
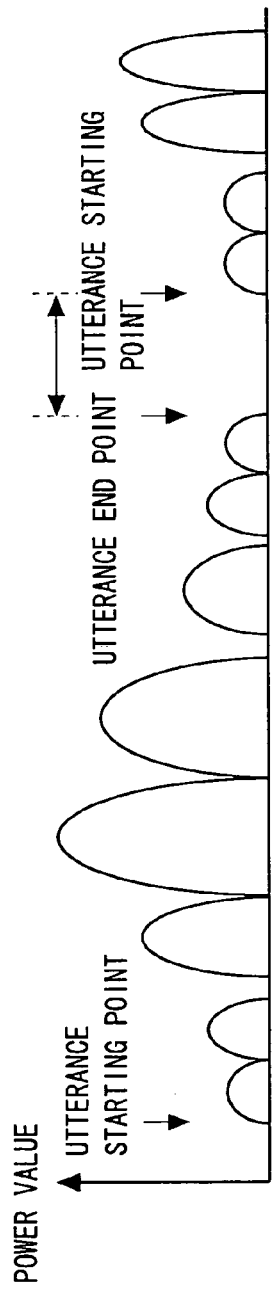
FIGS. 29A and 29B are graphs for explaining a problem occurred in the case of executing a process of diminishing a non-utterance section and a process of increasing the voice speed in a non-utterance section on the basis of misjudgment.
Figure 29B:
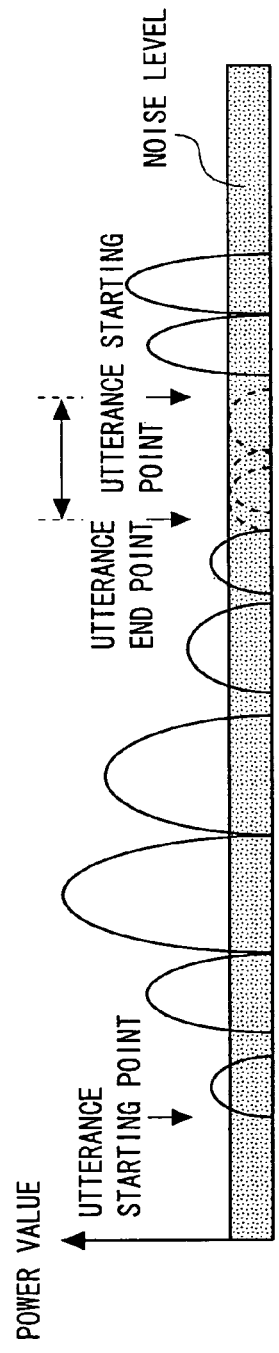

FIG. 24 is a flowchart showing an operational example of the voice speed control apparatus 1e. Note that the same processes in FIG. 24 as those shown in the flowchart in FIG. 5 are marked with the same reference symbols as in FIG. 5. Referring to FIG. 24, a description of the operational example of the voice speed control apparatus 1e will hereinafter be focused on the different processes from those of the voice speed control apparatus 1a.

Upon a start of processing, the signal-to-noise ratio acquiring unit 7 acquires the SN ratio in parallel with the utterance/non-utterance judging process (the process in S01) by the utterance/non-utterance judging unit 2a (S22). Then, after the continuation time calculating unit 3a has calculated the non-utterance continuation time (after S03), the voice speed determining unit 4e determines the voice speed in the non-utterance section on the basis of the SN ratio acquired by the signal-to-noise ratio acquiring unit 7 and the non-utterance continuation time obtained by the continuation time calculating unit 3a (S23). After this process, in the same way as in the case of the voice speed control apparatus 1a, the voice speed control unit 5a of the voice speed control apparatus 1e executes the processes in S05 and S06. Further, if the result of the judgment by the utterance/non-utterance judging unit 2a shows the utterance, the process becomes the same as in the case of the voice speed control apparatus 1a (refer to S07).

[Operation/Effect]

In the voice speed control apparatus 1e, the maximum voice speed is determined based on the SN ratio acquired by the signal-to-noise ratio acquiring unit 7. To be specific, in the voice speed control apparatus 1e, the maximum voice speed gets higher as the SN ratio gets higher, and the maximum voice speed becomes lower as the SN ratio becomes lower. Generally, in the case of the high SN ratio, it is shown that a noise quantity in the signals (which are herein the input signals) is small, there is a preferable state, and the reliability of the signals is high. Accordingly, in the case of the low SN ratio, i.e., if there is a high possibility that the misjudgment might be made in the utterance/non-utterance judgment, the adverse influence as of the skip of voice element (the missing voice element) when misjudged can be reduced by restraining low the maximum voice speed. By contrast, in the case of the high SN ratio, i.e., there is a low possibility that the misjudgment might be made, the maximum voice speed is set high, whereby the priority is given to setting the voice speed high rather than reducing the adverse influence caused by the misjudgment, and the accumulation of the delays can be effectively decreased.

MODIFIED EXAMPLE

The voice speed control apparatus 1e may also be configured to further include the delay quantity acquiring unit 6 used in the second embodiment. If thus configured, the voice speed determining unit 4e may be constructed so as to determine the maximum voice speed on the basis of not only the degree of reliability but also the accumulated delay quantity. For instance, the voice speed determining unit 4e may determine the maximum voice speed on the basis of a table consisting of three items (fields) of information such as the degree of reliability, the accumulated delay quantity and the maximum voice speed.

The present invention is applied to the apparatus in which the delay occurs when reproducing the voice, whereby the effects can be acquired.

[Others]

The disclosures of international application PCT/JP2004/010340 filed on Jul. 21, 2004 including the specification, drawings and abstract are incorporated herein by reference.

What is claimed is:

1. A voice speed control apparatus according comprising:
an utterance/non-utterance judging unit to judge whether a processing target segment in inputted a voice signal is an utterance segment or a non-utterance segment;
a non-utterance continuation length acquiring unit to acquire a non-utterance continuation length representing a length of the voice signal judging continuously to be the non-utterance by said utterance/non-utterance judging unit;
a determining unit to determine a reproducing speed of the processing target segment in the voice signal in accordance with the non-utterance continuation length acquired by said non-utterance continuation length acquiring unit so that the reproducing speed gets higher as the non-utterance continuation length gets larger and so that an increase in reproducing speed is restrained to a greater degree as the non-utterance continuation length becomes smaller;
a changing unit to change the reproducing speed of the voice signal, corresponding to the reproducing speed determined by said determining unit;
a speed decreasing unit to get if judged to be utterance by said utterance/non-utterance judging unit, the reproducing speed of the voice signal slower than a normal reproducing speed; and
a delay quantity acquiring unit to acquire cumulatively a delay quantity generated by said speed decreasing unit,
wherein said determining unit determines a maximum value of the reproducing speed on the basis of an accumulated value of the delay quantities acquired by said delay quantity acquiring unit so that the maximum value of the reproducing speed gets larger as the accumulated value of the delay quantities gets larger, and determines the reproducing speed in the processing target segment in the voice signals, corresponding to this maximum value and the non-utterance continuation length.

2. A voice speed control apparatus comprising:
an utterance/non-utterance judging unit to judge whether a processing target segment in inputted a voice signal is an utterance segment or a non-utterance segment;
a non-utterance continuation length acquiring unit to acquire a non-utterance continuation length representing a length of the voice signal judged continuously to be the non-utterance by said utterance/non-utterance judging unit;
a determining unit to determine a reproducing speed of the processing target segment in the voice signal in accordance with the non-utterance continuation length acquired by said non-utterance continuation length acquiring unit so that the reproducing speed gets higher as the non-utterance continuation length gets larger and so that an increase in reproducing speed is restrained to a greater degree as the non-utterance continuation length becomes smaller; and
a changing unit to change the reproducing speed of the voice signal, corresponding to the reproducing speed determined by said determining unit,
wherein said utterance/non-utterance judging unit further makes judgment about predetermined segments in the future direction from the processing target segment in the inputted voice signals,
said non-utterance continuation length acquiring unit acquires a future-directional continuation length representing a length of the signal judged to be the non-utterance signal continuously from the processing target segment in the future direction, and
said determining unit determines, if the future-directional continuation length is smaller than a threshold value, the reproducing speed in the processing target segment in accordance with the future-directional continuation length so that the reproducing speed becomes slower as the future-directional continuation length becomes smaller.

3. A voice speed control apparatus, comprising;
an utterance/non-utterance judging unit to judge whether a processing target segment in inputted a voice signal is an utterance segment or a non-utterance segment;
a non-utterance continuation length acquiring unit to acquire a non-utterance continuation length representing a length of the voice signal judged continuously to be the non-utterance by said utterance/non-utterance judging unit;

a determining unit to determine a reproducing speed of the processing target segment in the voice signal in accordance with the non-utterance continuation length acquired by said non-utterance continuation length acquiring unit so that the reproducing speed gets higher as the non-utterance continuation length gets larger and so that an increase in reproducing speed is restrained to a greater degree as the non-utterance continuation length becomes smaller; and a changing unit to change the reproducing speed of the voice signal, corresponding to the reproducing speed determined by said determining unit, wherein said utterance/non-utterance judging unit further acquires a degree of reliability on the non-utterance judgment result made by said utterance/non-utterance judgment unit about the respective segments to be judged, and said determining unit determines the maximum value of the reproducing speed in accordance with the degree of reliability on the non-utterance judgment result so that the maximum value of the reproducing speed gets larger as the degree of reliability on the non-utterance judgment result gets higher, and determines the reproducing speed in the processing target segment in the voice signals in accordance with the maximum value and the non-utterance continuation length.

4. A voice speed control apparatus, comprising:

an utterance/non-utterance judging unit to judge whether a processing target segment in inputted a voice signal is an utterance segment or a non-utterance segment;

a non-utterance continuation length acquiring unit to acquire a non-utterance continuation length representing a length of the voice signal judged continuously to be the non-utterance by said utterance/non-utterance judging unit;

a determining unit to determine a reproducing speed of the processing target segment in the voice signal in accordance with the non-utterance continuation length acquired by said non-utterance continuation length acquiring unit so that the reproducing speed gets higher as the non-utterance continuation length gets larger and so that an increase in reproducing speed is restrained to a greater degree as the non-utterance continuation length becomes smaller; and a changing unit to change the reproducing speed of the voice signal corresponding to the reproducing speed determined by said determining unit, wherein said utterance/non-utterance judging unit further acquires a degree of reliability on the judgment result about the respective segments to be judged, and said determining unit determines the maximum value of the reproducing speed in accordance with the degree of reliability so that the maximum value of the reproducing speed gets larger as the reliability gets higher, and determines the reproducing speed in the processing target segment in the voice signals in accordance with the maximum value and the non-utterance continuation length, and wherein said utterance/non-utterance judging unit subtracts an average of power values of the voice signals in the segments judged to be the non-utterance segments in the past from a power value of the voice signal in the processing target segment, and acquires, based on a result of this subtraction, a degree of reliability that gets higher as a value of the subtracted result gets lower and also a degree of reliability that becomes lower as the value of the subtracted result becomes higher.

5. A voice speed control apparatus comprising:

an utterance/non-utterance judging unit to judge whether a processing target segment in inputted a voice signal Is an utterance segment or a non-utterance segment;

a non-utterance continuation length acquiring unit to acquire a non-utterance continuation length representing a length of the voice signal judged continuously to be the non-utterance by said utterance/non-utterance judging unit;

a determining unit to determine a reproducing speed of the processing target segment in the voice signal in accordance with the non-utterance continuation length acquired by said non-utterance continuation length acquiring unit so that the reproducing speed gets higher as the non-utterance continuation length gets larger and so that an increase in reproducing speed is restrained to a greater degree as the non-utterance continuation length becomes smaller;

a changing unit to change the reproducing speed of the voice signal, corresponding to the reproducing speed determined by said determining unit; and a signal-to-noise ratio acquiring unit to acquire a signal-to-noise ratio in the processing target segment in the voice signals, wherein said determining unit determines a maximum value of the reproducing speed in accordance with the signal-to-noise ratio acquired by said signal-to-noise ratio acquiring unit so that the maximum value of the reproducing speed gets larger as the signal-to-noise ratio gets higher and so that the maximum value of the reproducing speed becomes smaller as the signal-to-noise ratio becomes lower, and determines the reproducing speed in the processing target segment in the voice signals in accordance with the maximum value and the non-utterance continuation length.

6. A recording medium recorded with a program, the program making an information processing apparatus execute:

judging whether a processing target segment in inputted voice signals is an utterance segment or a non-utterance segment;

acquiring a non-utterance continuation length representing a length of the voice signal judged continuously to be the non-utterance;

determining a reproducing speed of the processing target segment in the voice signals in accordance with the acquired non-utterance continuation length so that the reproducing speed gets higher as the non-utterance continuation length gets larger and so that an increase in reproducing speed is restrained to a greater degree as the non-utterance continuation length becomes smaller;

changing the reproducing speed of the voice signal, corresponding to the determined reproducing speed;

getting, if judged to be utterance by said judging, the reproducing speed of the voice signal slower than a normal reproducing speed; and acquiring cumulatively a delay quantity generated by said getting, wherein said determining determines a maximum value of the reproducing speed on the basis of an accumulated value of acquired delay quantities so that the maximum value of the reproducing speed gets larger as the accumulated value of the delay quantities gets larger, and determines the reproducing speed in the processing target segment in the voice signals, corresponding to this maximum value and the non-utterance continuation length.

7. A voice speed control method comprising:

judging whether a processing target segment in inputted voice signals is an utterance segment or a non-utterance segment;

acquiring a non-utterance continuation length representing a length of the voice signal judged continuously to be the non-utterance;

determining a reproducing speed of the processing target segment in the voice signals in accordance with the acquired non-utterance continuation length so that the reproducing speed gets higher as the non-utterance continuation length gets larger and so that an increase in reproducing speed is restrained to a greater degree as the non-utterance continuation length becomes smaller;

changing the reproducing speed of the voice signal, corresponding to the determined reproducing speed;

getting, if judged to be utterance by said judging, the reproducing speed of the voice signal slower than a normal reproducing speed; and acquiring cumulatively a delay quantity generated by said getting, wherein said determining determines a maximum value of the reproducing speed on the basis of an accumulated value of acquired delay quantities so that the maximum value of the reproducing speed gets larger as the accumulated value of the delay quantities gets larger, and determines the reproducing speed in the processing target segment in the voice signals, corresponding to this maximum value and the non-utterance continuation length.

* * * * *